US011345337B2

(12) United States Patent
Hasejima et al.

(10) Patent No.: US 11,345,337 B2
(45) Date of Patent: *May 31, 2022

(54) PARKING ASSISTANCE DEVICE

(71) Applicant: CLARION CO., LTD., Saitama (JP)

(72) Inventors: Noriyasu Hasejima, Tokyo (JP); Takehito Ogata, Tokyo (JP); Makoto Ishinoda, Saitama (JP); Shinya Tagawa, Saitama (JP)

(73) Assignee: CLARION CO., LTD., Saitama (JP)

( * ) Notice: Subject to any disclaimer, the term of this patent is extended or adjusted under 35 U.S.C. 154(b) by 344 days.

This patent is subject to a terminal disclaimer.

(21) Appl. No.: 16/603,524

(22) PCT Filed: Mar. 28, 2018

(86) PCT No.: PCT/JP2018/012688
§ 371 (c)(1),
(2) Date: Oct. 7, 2019

(87) PCT Pub. No.: WO2018/186252
PCT Pub. Date: Oct. 11, 2018

(65) Prior Publication Data
US 2021/0086756 A1   Mar. 25, 2021

(30) Foreign Application Priority Data

Apr. 7, 2017   (JP) .............................. JP2017-077135

(51) Int. Cl.
*B60W 30/06* (2006.01)
*B60W 30/10* (2006.01)
(Continued)

(52) U.S. Cl.
CPC ............ *B60W 30/06* (2013.01); *B60W 30/10* (2013.01); *B60W 50/14* (2013.01); *G06V 20/58* (2022.01);
(Continued)

(58) Field of Classification Search
CPC ...... B60W 30/06; B60W 30/10; B60W 50/14; B60W 2554/20; G06K 9/00805; G06K 9/00812
See application file for complete search history.

(56) References Cited

U.S. PATENT DOCUMENTS

| 6,683,539 | B2 * | 1/2004 | Trajkovic | ............... | B60Q 9/005 |
| | | | | | 180/271 |
| 2011/0080304 | A1 * | 4/2011 | Toledo | ................... | G08G 1/165 |
| | | | | | 340/932.2 |

(Continued)

FOREIGN PATENT DOCUMENTS

| JP | 2001-018821 A | 1/2001 |
| JP | 2007-062623 A | 3/2007 |

(Continued)

OTHER PUBLICATIONS

Extended European Search Report dated Dec. 10, 2020 for European Patent Application No. 18781228.4.

(Continued)

*Primary Examiner* — Chico A Foxx
(74) *Attorney, Agent, or Firm* — Volpe Koenig

(57) ABSTRACT

A parking assistance device for resetting a parking path when an obstacle is on the parking path includes a pull-out path computing unit that computes a pull-out path for pulling the vehicle out of the parking space based on parking space information and constraints regarding vehicle behavior, a candidate connection position setting unit that sets a plurality of candidate connection positions on the pull-out path, a reachable path computing unit that computes a reachable path for allowing the vehicle to reach at least one of the candidate connection positions from the initial position, a parking path setting unit that sets a parking path of from the initial position to the parking space by connecting the pull-out and reachable paths, and a path resetting unit (Continued)

that computes a parking path of from the stop position to the parking space, and sets the computed parking path as a new parking path.

8 Claims, 26 Drawing Sheets

(51) Int. Cl.
    *B60W 50/14*        (2020.01)
    *G06K 9/00*         (2022.01)
    *G06V 20/58*       (2022.01)

(52) U.S. Cl.
    CPC ....... *G06V 20/586* (2022.01); *B60W 2554/20* (2020.02)

(56) References Cited

U.S. PATENT DOCUMENTS

| | | | | |
|---|---|---|---|---|
| 2011/0087406 A1* | 4/2011 | Barth | ............... | B60Q 1/48 |
| | | | | 701/41 |
| 2011/0156928 A1* | 6/2011 | Ghisio | ............... | B62D 15/0285 |
| | | | | 340/932.2 |
| 2013/0096816 A1* | 4/2013 | Takano | ............... | G06F 17/00 |
| | | | | 701/400 |
| 2014/0055615 A1* | 2/2014 | Chen | ............... | B62D 15/028 |
| | | | | 348/148 |
| 2014/0114529 A1* | 4/2014 | An | ............... | B60W 30/06 |
| | | | | 701/36 |
| 2014/0368636 A1* | 12/2014 | Lee | ............... | B62D 15/0285 |
| | | | | 348/118 |
| 2015/0100177 A1* | 4/2015 | Inagaki | ............... | B62D 15/0285 |
| | | | | 701/1 |
| 2015/0375742 A1* | 12/2015 | Gebert | ............... | B62D 15/027 |
| | | | | 701/23 |
| 2016/0257303 A1* | 9/2016 | Lavoie | ............... | B60W 30/06 |
| 2016/0257304 A1* | 9/2016 | Lavoie | ............... | B60W 30/06 |
| 2016/0257343 A1* | 9/2016 | Freistadt | ............... | B60W 30/06 |
| 2017/0028984 A1* | 2/2017 | Kiyokawa | ............... | G01S 15/931 |
| 2017/0227967 A1* | 8/2017 | Bariant | ............... | G08G 1/168 |
| 2018/0039264 A1* | 2/2018 | Messner | ............... | G05D 1/0238 |
| 2018/0111610 A1* | 4/2018 | Romainczyk | ............... | B60W 50/14 |
| 2018/0308359 A1* | 10/2018 | Hayakawa | ............... | B60W 30/06 |
| 2018/0339701 A1* | 11/2018 | Kwon | ............... | G05D 1/0246 |
| 2019/0176888 A1* | 6/2019 | Lee | ............... | G05D 1/0225 |
| 2021/0402986 A1* | 12/2021 | Imai | ............... | G08G 1/168 |

FOREIGN PATENT DOCUMENTS

| | | |
|---|---|---|
| JP | 2007-320433 A | 12/2007 |
| JP | 2010-208392 A | 9/2010 |
| JP | 2017-052434 A | 3/2017 |
| WO | 2013/072134 A1 | 5/2013 |

OTHER PUBLICATIONS

International Search Report dated Jul. 3, 2018 for the International PCT Application No. PCT/JP2018/012688.

* cited by examiner

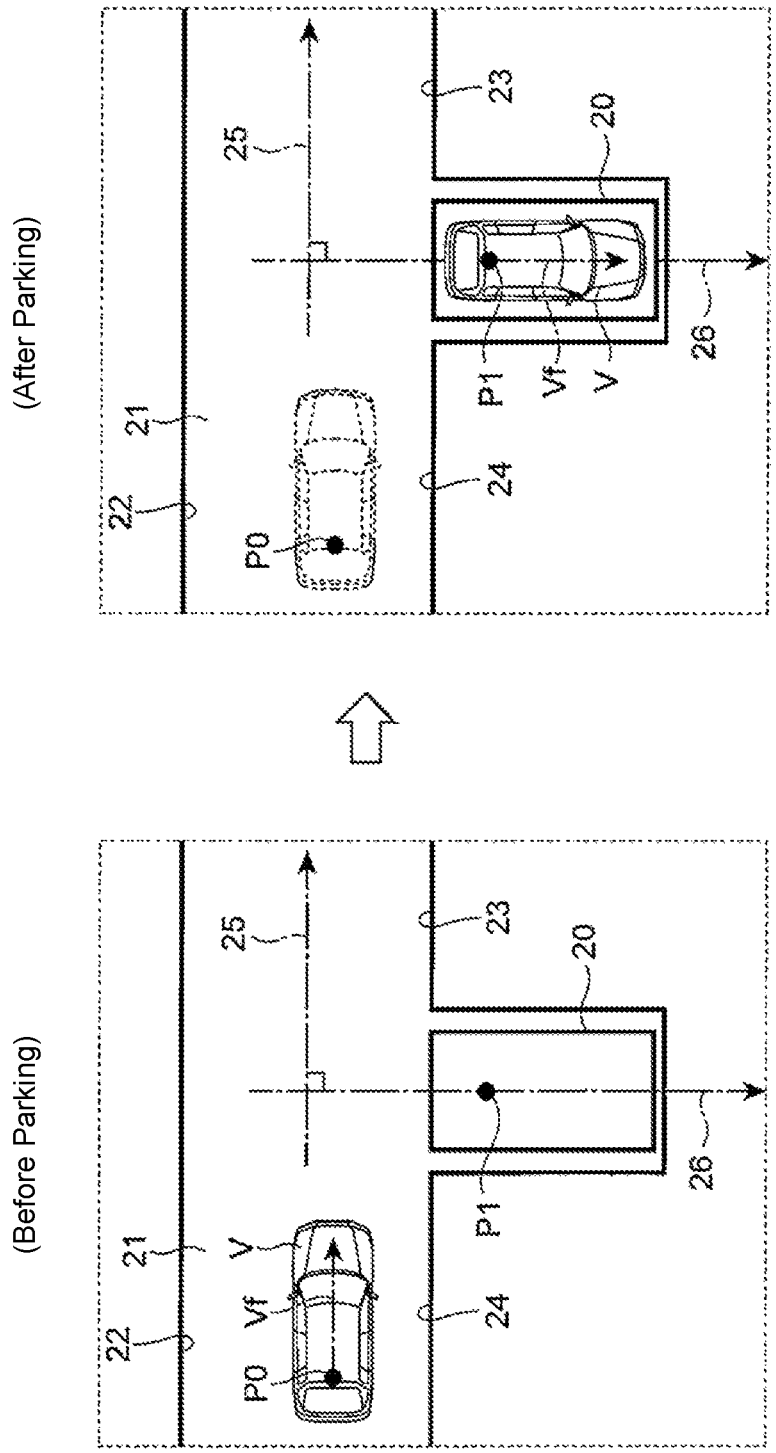

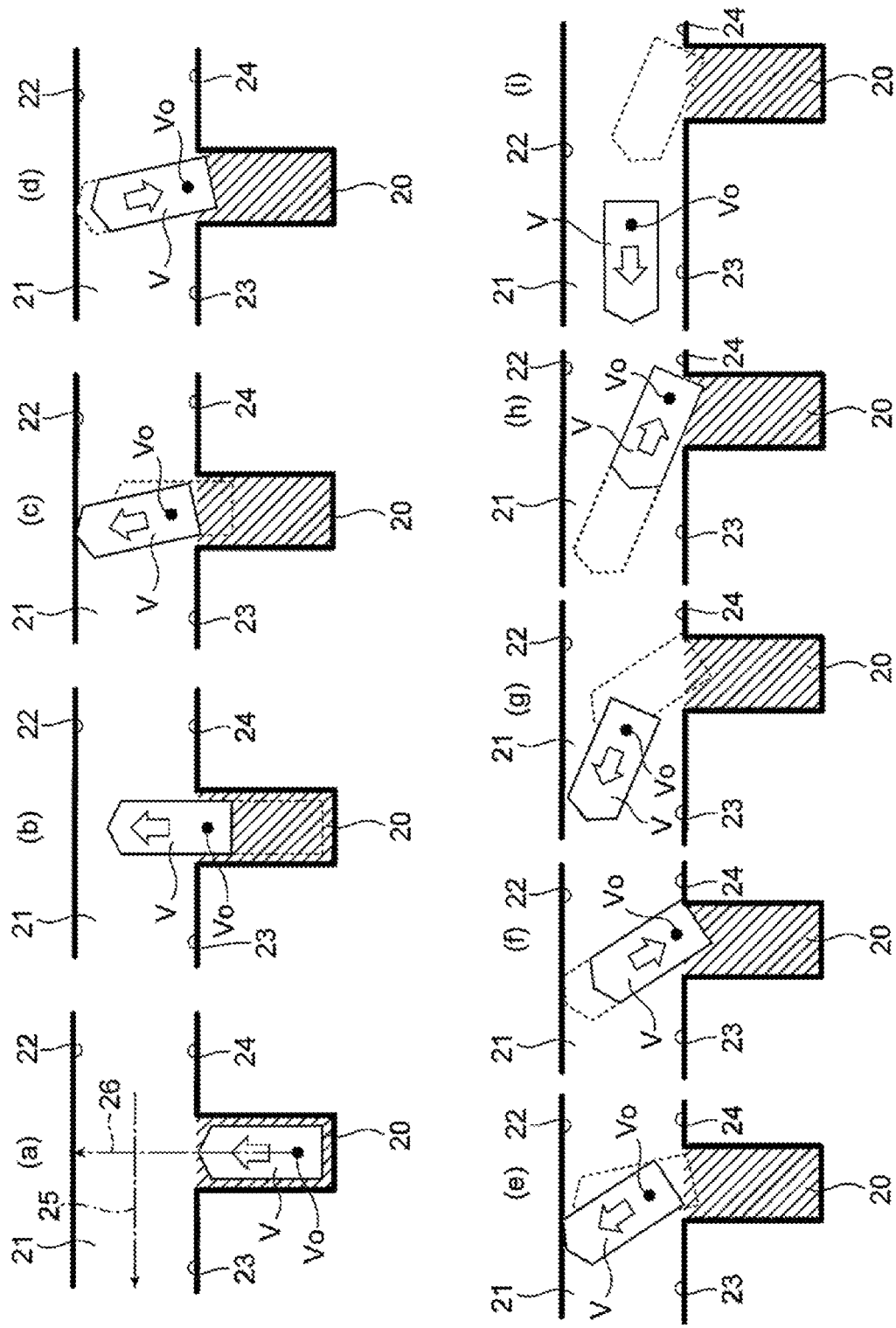

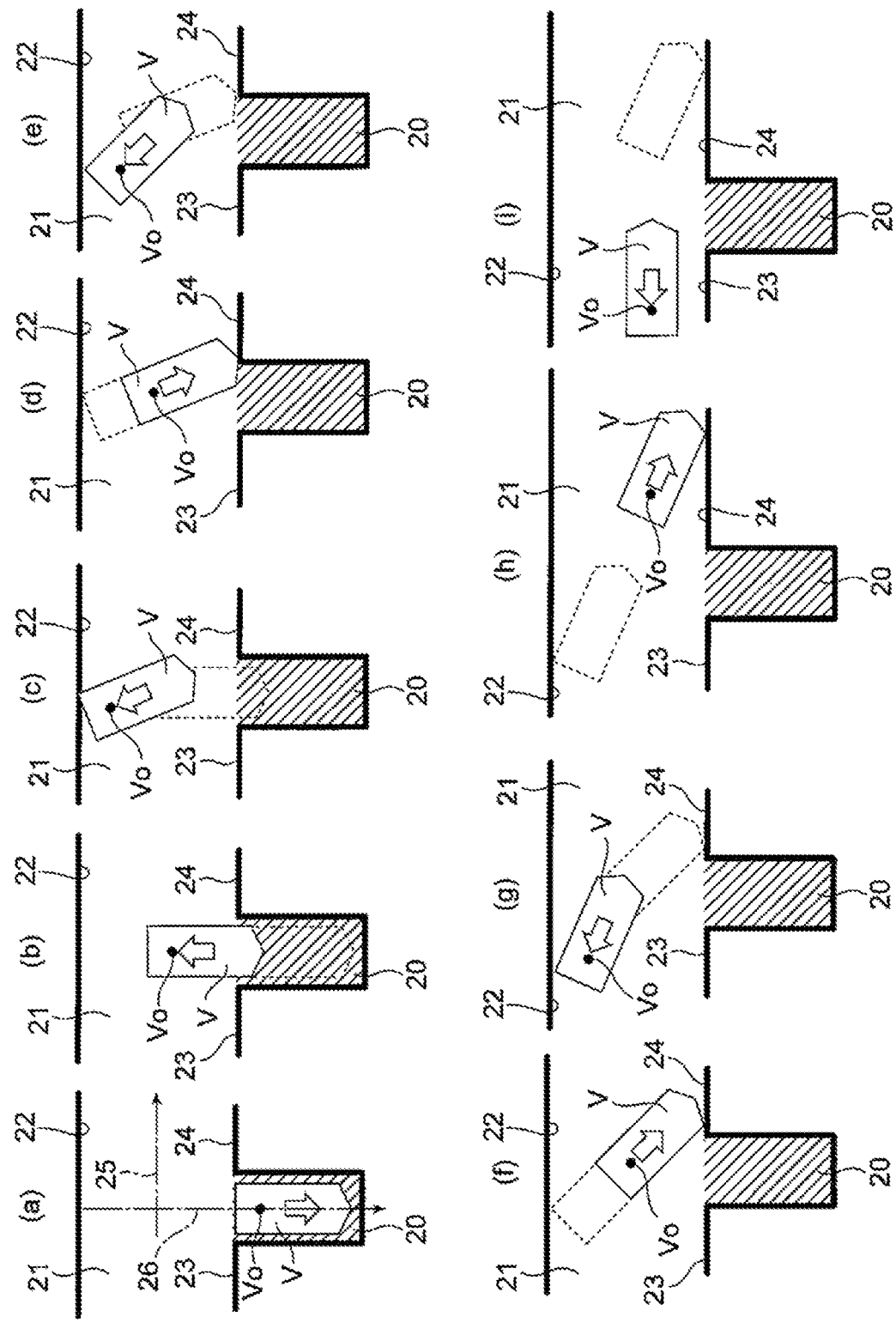

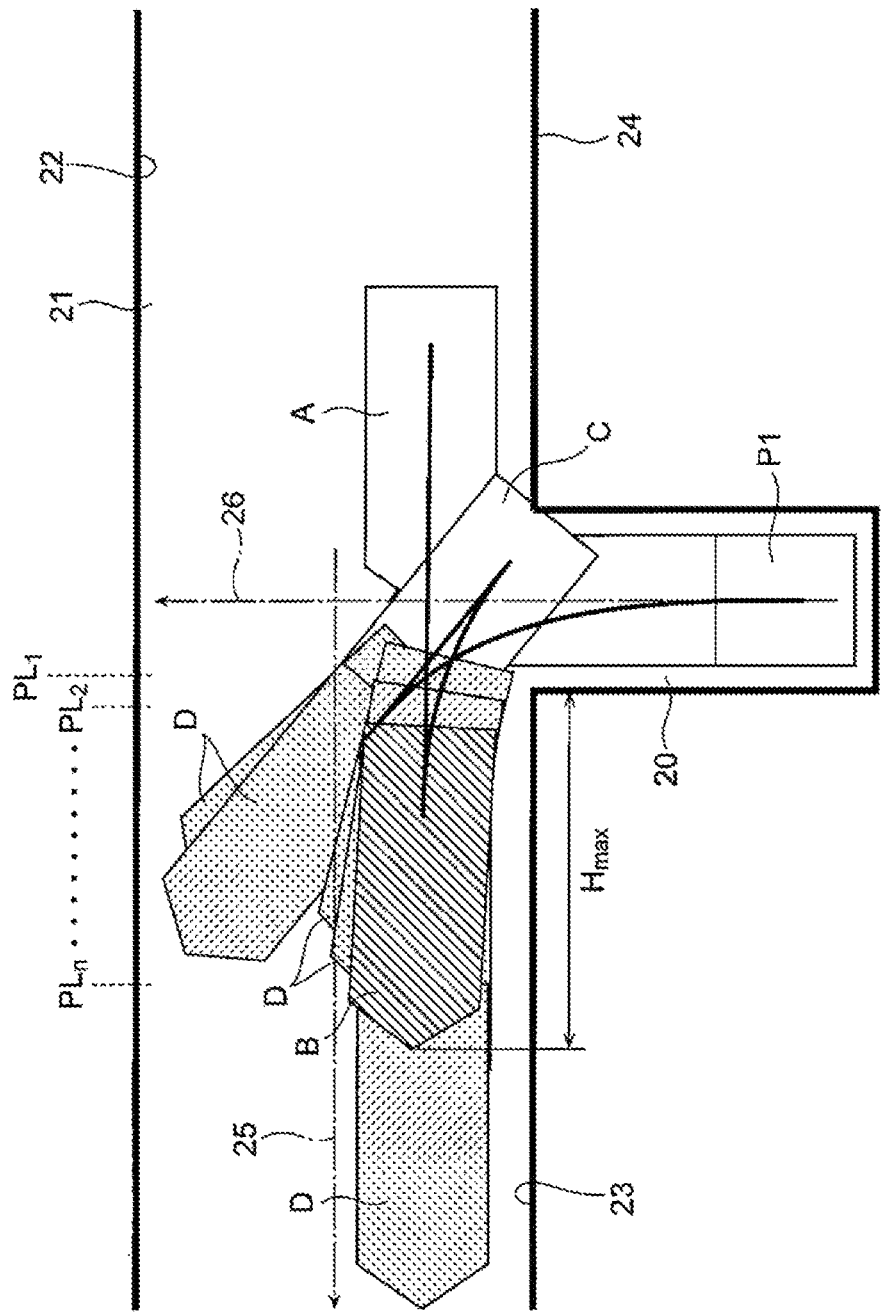

PARKING ASSISTANCE DEVICE

TECHNICAL FIELD

The present invention relates to a parking assistance device for a vehicle.

BACKGROUND ART

Patent Literature 1 discloses a technique of a parking assistance device that assists in parking a vehicle by computing a guidance path, which includes switching of the direction of vehicle travel for parking the vehicle, so that the vehicle can reach a target position along the guidance path.

CITATION LIST

Patent Literature

Patent Literature 1: JP 2010-208392 A

SUMMARY OF INVENTION

Technical Problem

However, when information on obstacles is updated while the vehicle is actually guided along the computed path and an obstacle that has not been detected during the computation is detected on the path, it becomes impossible to guide the vehicle along the path any further. Therefore, a guidance error occurs and the vehicle stops at that position if the vehicle is being driven automatically, or the guidance terminates if the vehicle is being driven manually by the driver, with the result that the driver has to operate the vehicle by himself/herself from then to park the vehicle without guidance.

The present invention has been made in view of the foregoing. It is an object of the present invention to provide a parking assistance device for resetting a parking path when there is an obstacle on the parking path.

Solution to Problem

The parking assistance device of the present invention that solves the aforementioned problem is a parking assistance device for assisting in parking a vehicle in a parking space that is provided on one side of a road, including a pull-out path computing unit configured to compute a pull-out path for pulling the vehicle out of the parking space on the basis of information on the parking space and constraint conditions regarding vehicle behavior; a candidate connection position setting unit configured to set a plurality of candidate connection positions on the pull-out path computed by the pull-out path computing unit; a reachable path computing unit configured to compute a reachable path that allows the vehicle to reach at least one of the plurality of candidate connection positions from an initial position of the vehicle; a parking path setting unit configured to set a parking path of from the initial position of the vehicle to the parking space by connecting the pull-out path and the reachable path; and a path resetting unit configured to, when there is an obstacle on the parking path, compute a parking path of from a stop position of the vehicle to the parking space, and set the computed parking path as a new parking path.

Advantageous Effects of Invention

According to the present invention, a parking path is reset when there is an obstacle on the parking path. Therefore, moving the vehicle along the reset parking path can repark the vehicle in the parking space. Further features related to the present invention will become apparent from the description of the specification and the accompanying drawings. In addition, other problems, configurations, and advantageous effects will become apparent from the following description of embodiments.

BRIEF DESCRIPTION OF DRAWINGS

FIG. 2B illustrate the state of front-in perpendicular parking, specifically, the state of a vehicle before and after the parking.

FIG. 3 illustrate an exemplary method of computing a pull-out path for back-in perpendicular parking.

FIG. 4 illustrate an exemplary method of computing a pull-out path for front-in perpendicular parking.

FIG. 5 illustrates candidate connection positions on a pull-out path for back-in perpendicular parking.

DESCRIPTION OF EMBODIMENTS

Next, embodiments of the present invention will be described with reference to the drawings.

Figure 1:
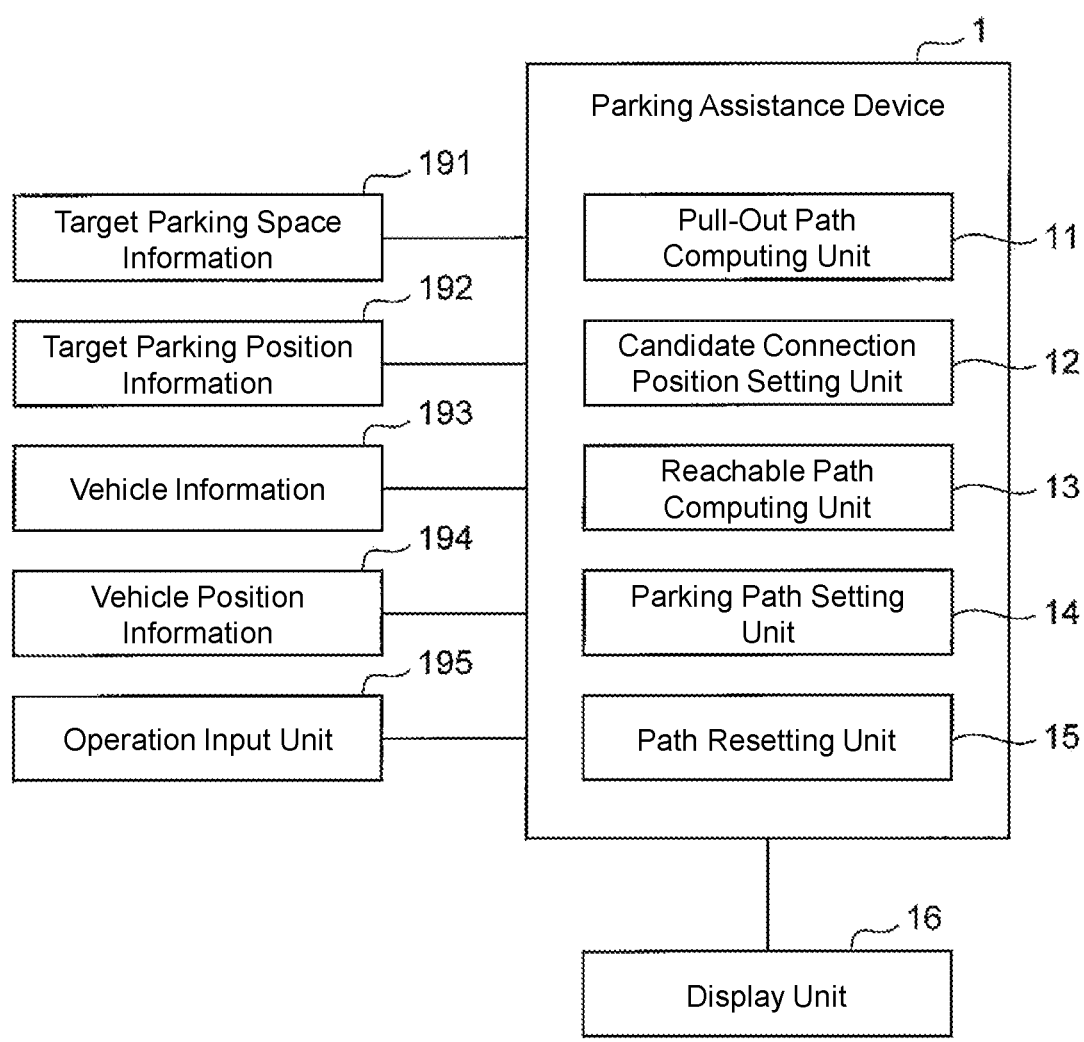
FIG. 1 is a functional block diagram of a parking assistance device according to an embodiment of the present invention.
Figure 2A:
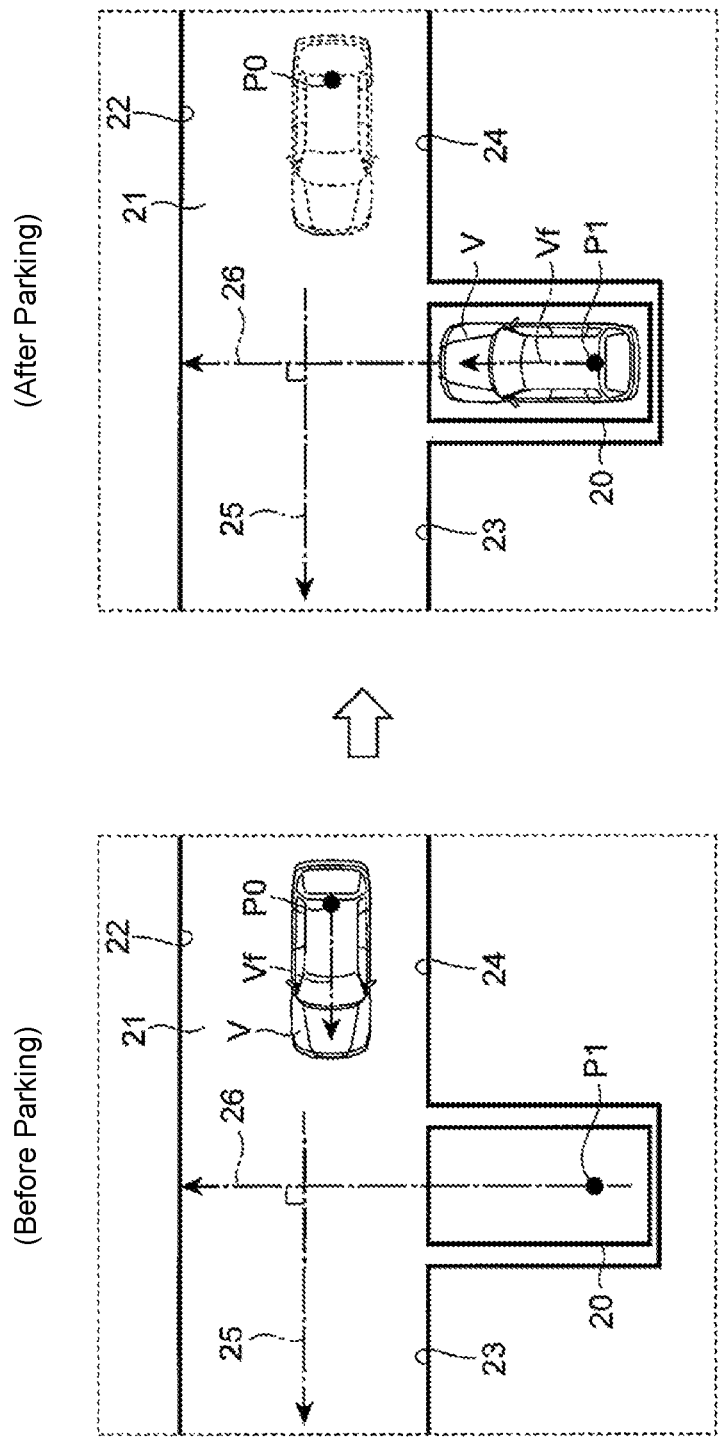
FIG. 2A illustrate the state of back-in perpendicular parking, specifically, the state of a vehicle before and after the parking.

FIG. 1 is a functional block diagram of a parking assistance device according to an embodiment of the present invention. FIG. 2A illustrate the state of back-in perpendicular parking, specifically, the state of a vehicle before and after the parking. FIG. 2B illustrate the state of front-in perpendicular parking, specifically, the state of a vehicle before and after the parking.

The parking assistance device 1 is a device for assisting in parking a vehicle V in a parking space 20, and in particular, a device for assisting in so-called perpendicular parking so that the vehicle V is parked in the parking space 20 having a parking orientation 26 arranged at right angles to a road orientation 25 of a road 21. The parking space 20 means a zoned area having a parking orientation set therein in advance so as to allow a vehicle to be parked in a predetermined orientation in the parking space 20. The parking space 20 is also referred to as a parking frame, parking slot, parking area, paring place, or parking lot, for example.

In the example illustrated in FIG. 2A, the parking space 20 is provided on the left side with respect to the road orientation 25 of the road 21, and has the parking orientation 26 set therein so as to allow the vehicle V to be reverse parked in the parking space 20. In the example illustrated in FIG. 2B, the parking space 20 is provided on the right side with respect to the road orientation 25 of the road 21, and has the parking orientation 26 set therein so as to allow the vehicle V to be front-in parked in the parking space 20.

As illustrated in FIGS. 2A and 2B, the parking assistance device 1 computes a path for guiding the vehicle V so that the vehicle V is arranged with the vehicle orientation Vf directed in the same orientation as the parking orientation 26 at the target parking position P1 in the parking space 20 from the state in which the vehicle V is at the initial position P0 on the road 21 with the vehicle orientation Vf directed in the same orientation as the road orientation 25, and sets the computed path as a parking path.

Then, if information on obstacles is updated while the vehicle V is moved along the set parking path and it is found that there is an obstacle on the parking path, a process of newly setting another parking path is performed.

In the parking environment in which the vehicle V is parked, as illustrated in FIGS. 2A and 2B, obstacles 23 and 24, such as other vehicles or other parking spaces, are arranged ahead of or behind the parking space 20 along the road 21, and also, an obstacle 22, such as a wall or a curb extending along the road orientation 25 of the road 21 or another vehicle, is arranged across the road 21 opposite to the parking space 20. It should be noted that in the present embodiment, the obstacles 23 and 24 are always present on the opposite sides of the parking space 20.

Whether the vehicle V is at the initial position P0, the target parking position P1, a stop position J0, a back-up position J1, a park-out position B, or the like is determined with reference to a reference point Vo that is an intermediate position between the right and left rear wheels of the vehicle V. In addition, the vehicle is turned along a clothoid curve, for example.

The parking assistance device 1 computes a parking path for guiding the vehicle V into the parking space 20. Therefore, moving the vehicle V along the computed parking path can park the vehicle V in the parking space 20 on the side of the road. Meanwhile, if an obstacle that has not been detected during the computation of the parking path is detected, the parking path is recomputed and a new parking path is set. Therefore, moving the vehicle V along the new parking path can reliably park the vehicle V in the parking space 20.

The vehicle V may be moved by being operated by the driver while he/she is watching an in-vehicle monitor that displays the parking path, for example. Alternatively, a system may be configured such that information on the parking path is output from the parking assistance device 1 and the vehicle V is parked at the target parking position P1 either automatically or semi-automatically. When the vehicle V is parked semi-automatically, steering wheel operations are controlled automatically, while accelerator and brake operations are conducted by the driver, for example. Meanwhile, when the vehicle V is parked automatically, all of the steering wheel operations and accelerator and brake operations are controlled automatically.

The parking assistance device 1 is mounted on the vehicle V, and is implemented through cooperative operations of hardware, such as a microcomputer, and a software program. The parking assistance device 1 includes, as illustrated in FIG. 1, a pull-out path computing unit 11, a candidate connection position setting unit 12, a reachable path computing unit 13, a parking path setting unit 14, and a path resetting unit 15.

The pull-out path computing unit 11 computes at least one pull-out path for pulling the vehicle V out of the target parking space 20 on the basis of information on the target parking space and constraint conditions regarding vehicle behavior. The candidate connection position setting unit 12 sets a plurality of candidate connection positions on each pull-out path. The reachable path computing unit 13 computes a reachable path that allows the vehicle V to reach each candidate connection position from the initial position P0 as the current position of the vehicle V. The parking path setting unit 14 sets a parking path for the vehicle V by connecting the pull-out path and the reachable path. If there is an obstacle on the parking path, the path resetting unit 15 recomputes the parking path and sets it as a new parking path. If a plurality of parking paths is obtained through the recomputation, the path resetting unit 15 selects an optimal parking path from among them on the basis of predetermined conditions.

The parking assistance device 1 receives, as illustrated in FIG. 1, target parking space information 191, target parking position information 192, vehicle information 193, and vehicle position information 194. The target parking space information 191 includes information on constraint conditions regarding a parking space, such as the positions of and distances to obstacles around the parking space 20.

The target parking position information 192 includes information, such as the shape of the parking space 20 and the relative position of the parking space 20 with respect to the vehicle V. The target parking space information 191 and the target parking position information 192 can be obtained from a detected signal of an ultrasonic sensor mounted on the vehicle V or an image from an in-vehicle camera, for example. In addition, infrastructure information output from a parking facility may be obtained.

The vehicle information 193 includes information on constraint conditions regarding vehicle behavior, such as a turning radius of the vehicle V. For the vehicle position information 194, dead reckoning positions computed with a vehicle model on the basis of the steering angle and speed of the vehicle V as well as the number of revolutions of the wheels may be used, and also, positional information obtained with a sensor, such as a GPS, or vehicle position information obtained through road-vehicle communication or inter-vehicle communication may be used.

The operation input unit 195 inputs to the parking assistance device 1 information on a parking space selected by a user, for example. The display unit 16 is an in-vehicle monitor that the driver can watch in the vehicle, and can display the positions for switching the direction of vehicle travel for a target parking path in a manner overlapped with a video from a camera. The display unit 16 may display not only the positions for switching the direction of vehicle travel but also the entire parking path. Then, the driver is able to watch and check the positions for switching the direction of vehicle travel as well as a parking path displayed on the in-vehicle monitor. The display unit 16 is configured to convey information that the parking path is being recomputed by the path resetting unit. For example, the display unit 16 displays information that the parking path is being recomputed and outputs sound data to inform the driver that the parking path is being recomputed.

<Pull-Out Path Computing Unit>

The pull-out path computing unit 11 computes a pull-out path on the basis of the target parking space information 191, the target parking position information 192, and the vehicle information 193.

The pull-out path is a virtual movement path obtained by estimating a path along which the vehicle V is pulled out of the parking space 20 from the state in which the vehicle V is correctly arranged in the parking space 20. The pull-out path is computed totally independently of and without relevance to the initial position P0 of the vehicle V. The pull-out path computing unit 11 does not use the vehicle position information 194 when computing the pull-out path. More than one pull-out path may be computed, and at least one pull-out path is computed.

The pull-out path is computed on the basis of information on the target parking space and the constraint conditions regarding vehicle behavior. For example, when back-in perpendicular parking is assisted, provided that the target parking position P1 is the origin, a path, which is based on the premise that the vehicle V will be pulled out of the parking space in the same direction as the orientation of the vehicle V at the initial position P0, is created, while when front-in perpendicular parking is assisted, provided that the target parking position P1 is the origin, a path, which is based on the premise that the vehicle V will be pulled out of the parking space in the direction opposite to the orientation of the vehicle V at the initial position P0, is created.

For example, when back-in perpendicular parking is assisted to allow the vehicle V to be reverse parked at the target parking position P1, the following paths are computed: a path for moving the vehicle V straight forward from the target parking position P1 until the reference point Vo that is an intermediate position between the right and left rear wheels of the vehicle V (hereinafter referred to as a "position Vo" of the vehicle) reaches a position outside of the parking space 20; a forward drive path for moving the vehicle V forward while turning it in the same direction as the orientation of the vehicle V at the initial position P0 so as to leave the parking space until the vehicle V reaches a reachable limit position with respect to an obstacle ahead; and a reverse drive path for backing up the vehicle V with its front wheels adjusted straight again with respect to the vehicle V until the vehicle V reaches a reachable limit position with respect to an obstacle behind. The forward drive path and the reverse drive path are alternately computed to compute a pull-out path until a predetermined termination condition is satisfied. It should be noted that the "reachable limit position" means a position at which the vehicle V is away from an obstacle with a predetermined gap therebetween. The predetermined gap includes a predetermined error taken into consideration as a margin so that the vehicle V will not contact the obstacle. The predetermined gap is preferably as small as possible, and is set to about 1 to 5 cm, for example. In the present embodiment, a virtual frame with a predetermined gap is set in a region around the outer periphery of the vehicle V, and a position at which the virtual frame contacts the obstacle is determined as a reachable limit position.

Meanwhile, when front-in perpendicular parking is assisted to allow the vehicle V to be front-in parked at the target parking position P1, the following paths are computed: a path for backing up the vehicle V straight from the target parking position P1 until the position Vo of the vehicle V reaches a point that is away from the parking space 20 by a predetermined distance; a reverse drive path for backing up the vehicle V while turning it in a direction opposite to the orientation of the vehicle V at the initial position P0 so as to leave the parking space until the vehicle V reaches a reachable limit position with respect to an obstacle behind; and a forward drive path for moving the vehicle V forward while turning it in the same direction as the orientation of the vehicle V at the initial position P0 so as to leave the parking space until the vehicle V reaches a reachable limit position with respect to an obstacle ahead. The forward drive path and the reverse drive path are alternately computed to compute a pull-out path until a predetermined termination condition is satisfied.

The pull-out path computing unit 11 computes a pull-out path until at least one of the following conditions is satisfied as the predetermined termination condition, for example: a first condition in which the vehicle orientation Vf of the vehicle V on the pull-out path has an angle greater than or equal to 90° [deg] with respect to the parking orientation 26 and is in parallel with and in the same orientation as the road orientation 25, a second condition in which the vehicle V has reached a point that is away from the target parking position P1 by a predetermined distance Hmax along the road orientation 25, or a third condition in which the number of switching of the direction of vehicle travel on the pull-out path has reached a predetermined number.

FIGS. 3 and 4 each illustrate an exemplary method of computing a pull-out path for a vehicle according to preset conditions. Specifically, FIG. 3 illustrate a case for back-in perpendicular parking, and FIG. 4 illustrate a case for front-in perpendicular parking.

The pull-out path is computed as follows for back-in perpendicular parking exemplarily illustrated in FIG. 3, for example: (a) the vehicle V is moved straight forward from the state in which the vehicle V is parked in the parking space 20, (b) the position Vo of the vehicle V reaches a position outside of the parking space 20, (c) the vehicle V is moved forward from that position while being turned to the left until the vehicle V reaches a reachable limit position with respect to the obstacle 22 ahead, (d) the vehicle V is backed up from that position with its front wheels adjusted straight again along the vehicle orientation of the vehicle V until the vehicle V reaches a reachable limit position with respect to the obstacle 24 behind, and then, the vehicle V is moved along (e) a forward drive path for moving the vehicle V forward while turning it to the left, (f) a reverse drive path for backing up the vehicle V straight, (g) a forward drive path for moving the vehicle V forward while turning it to the left, and (h) a reverse drive path for backing up the vehicle V straight so that (i) the vehicle orientation Vf of the vehicle V has an angle of 90° [deg] with respect to the parking orientation 26 of the parking space 20 and is in parallel with and in the same orientation as the road orientation 25.

Similarly, the pull-out path is computed as follows for front-in perpendicular parking exemplarily illustrated in FIG. 4, for example: (a) the vehicle V is backed up straight from the parking space 20 from the state in which the vehicle V is parked at the target parking position P1, (b) the position Vo of the vehicle V reaches a point that is away from the parking space 20 by a predetermined distance, (c) the vehicle V is backed up while being turned to the right until the vehicle V reaches a reachable limit position with respect to the obstacle 22 behind, (d) the vehicle V is moved forward from that position while being turned to the left until the vehicle V reaches a reachable limit position with respect to the obstacle 22 ahead, and then, the vehicle V is moved along (e) a reverse drive path for backing up the vehicle V while turning it to the right, (f) a forward drive path for moving the vehicle V forward while turning it to the left, (g) a reverse drive path for backing up the vehicle V while turning it to the right, and (h) a forward drive path for moving the vehicle V forward while turning it to the left so that (i) the vehicle orientation of the vehicle V has an angle of 90° [deg] with respect to the parking orientation of the parking space 20 and is in parallel with and in the same orientation as the road orientation 25.

It should be noted that the method of computing the pull-out path is not limited to the ones described above, and computation may be performed using other conditions. Further, computation may be performed using a condition suitable for a target parking space that has been selected from among a plurality of preset conditions.

The pull-out path computing unit 11 recomputes the pull-out path each time at least one of the target parking space information 191, the target parking position information 192, or the vehicle information 193 is updated. For example, when information on obstacles is updated and an obstacle is detected on the parking path, the pull-out path computing unit 11 recomputes the pull-out path for pulling the vehicle V out of the parking space 20 on the basis of information on the parking space and constraint conditions regarding vehicle behavior at that time.

<Candidate Connection Position Setting Unit>

The candidate connection position setting unit 12 sets a plurality of candidate connection positions on the pull-out path. A candidate connection position is a candidate position for determining whether the initial position P0 can be connected to the pull-out path via a reachable path. As one of methods of setting candidate connection positions, for example, the candidate connection position setting unit 12 sets a plurality of candidate connection lines PL at predetermined intervals on the road 21 along the road orientation of the road 21, and sets the positions of intersection between the position Vo of the vehicle V and the candidate connection lines PL on the pull-out path as candidate connection positions D, and then stores the candidate connection positions D in association with the vehicle orientations Vf of the vehicle V at those positions.

FIG. 5 illustrates candidate connection positions on a pull-out path for back-in perpendicular parking.

The candidate connection lines PLn (n is a number) are set such that they extend in the width direction of the road 21 at positions ahead of the target parking position P1, along the road orientation of the road 21. Specifically, the candidate connection lines PLn are set at predetermined intervals on the road 21 in the leftward direction from the parking space 20, for example, at intervals of 0.5 to 1.5 m along the lateral direction with reference to the target parking position P1 in the present embodiment. In addition, positions at which the position Vo of the vehicle V passes the candidate connection lines PL on the pull-out path are set as the candidate connection positions D, and the vehicle orientations Vf of the vehicle V at those positions are stored. It should be noted that in the drawing, symbol A denotes the initial position, symbol B denotes a park-out position, symbol P1 denotes the target parking position, and symbol C denotes the reachable limit position.

Figure 6:
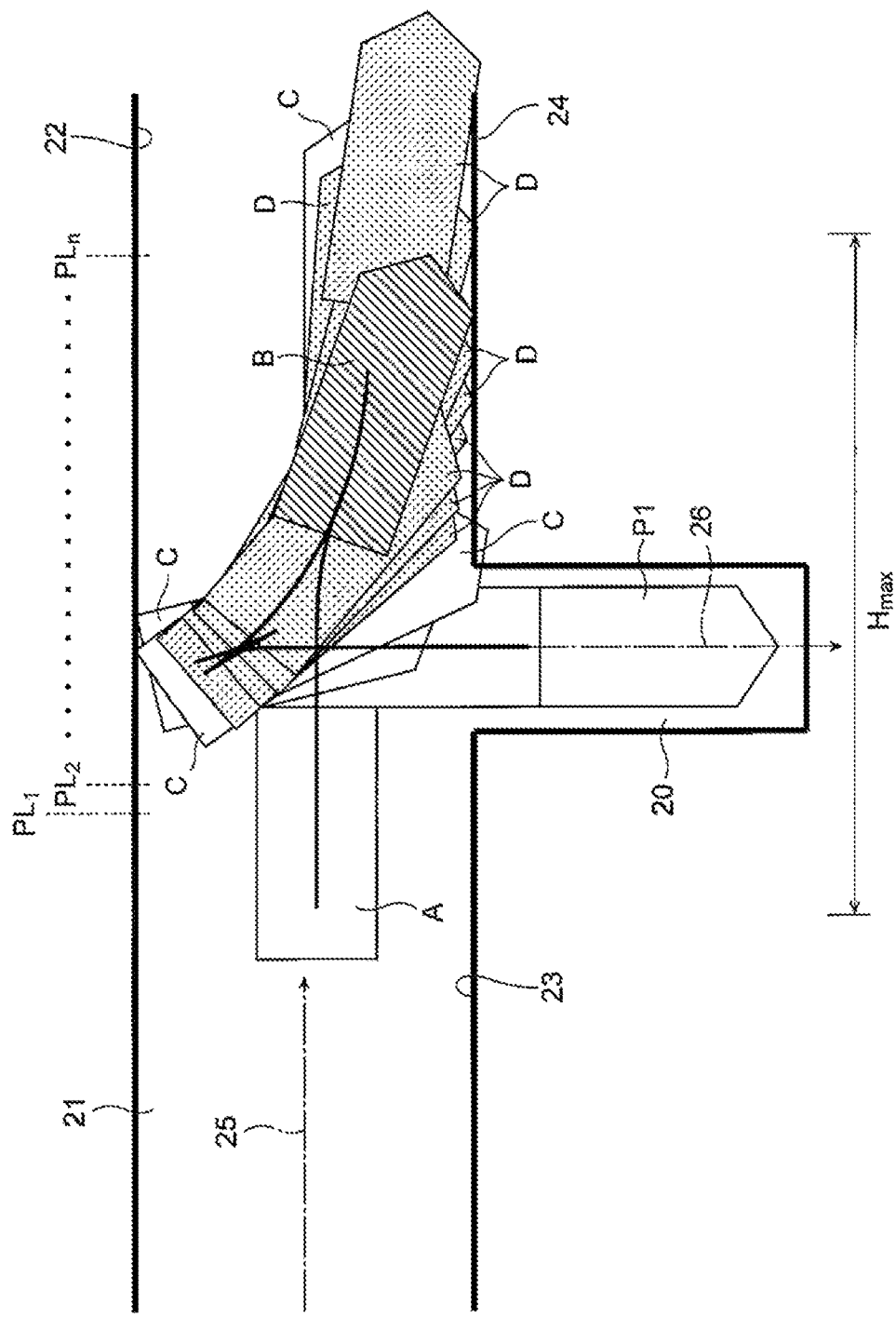
FIG. 6 illustrates candidate connection positions on a pull-out path for front-in perpendicular parking.

FIG. 6 illustrates candidate connection positions on a pull-out path for front-in perpendicular parking.

The candidate connection lines PL are set such that they extend in the width direction of the road 21 at positions ahead of the target parking position P1, along the road orientation of the road 21, for example, at intervals of 0.5 m along the road orientation 25 of the road 21 in the present embodiment. In addition, positions at which the position Vo of the vehicle V passes the candidate connection lines PL on the pull-out path are set as the candidate connection positions D, and the vehicle orientations Vf of the vehicle V at those positions are stored.

Figure 7:
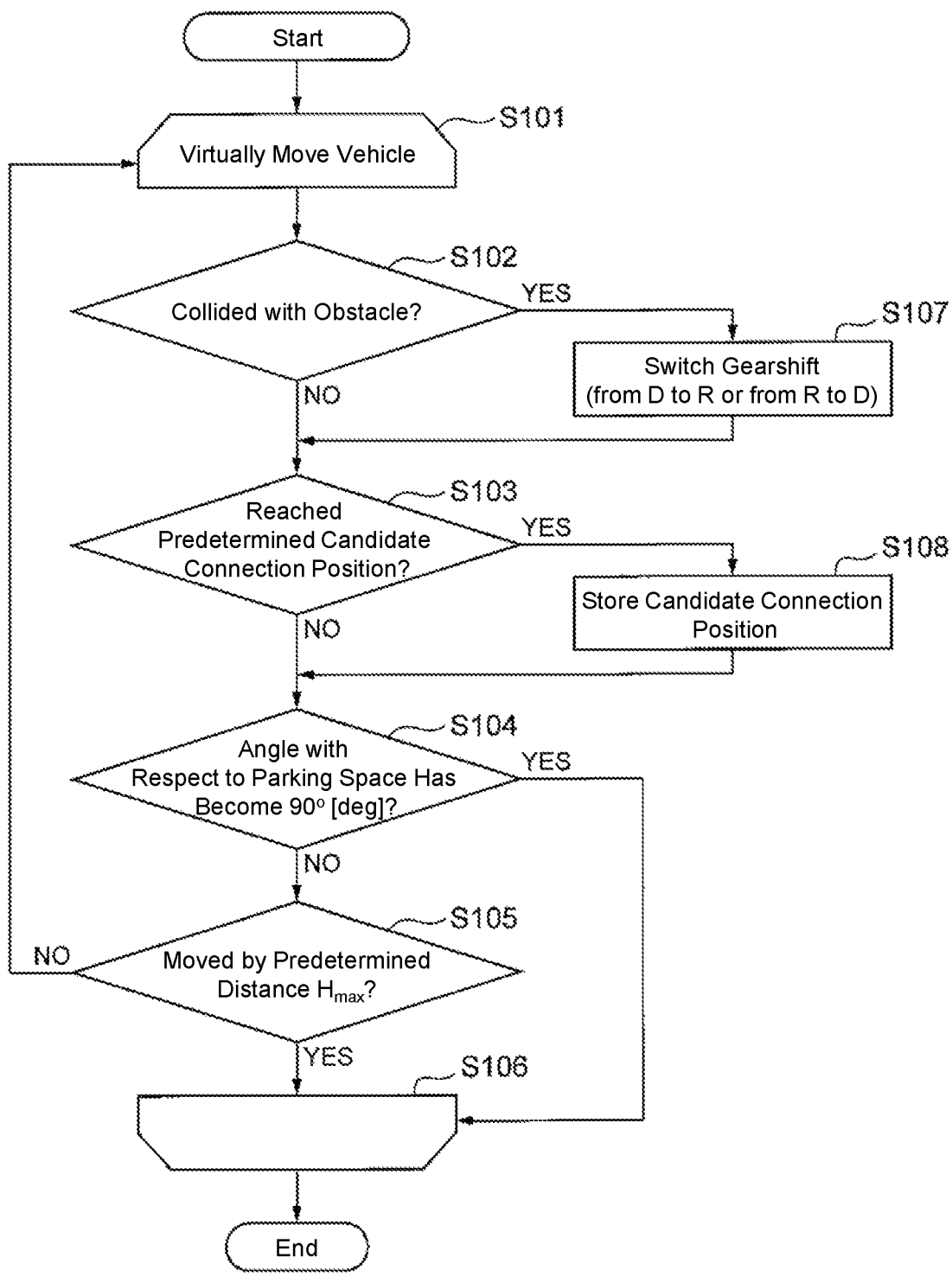
FIG. 7 is a flowchart illustrating a method of computing candidate connection positions on a pull-out path.

FIG. 7 is a flowchart illustrating a method of computing candidate connection positions on the pull-out path.

First, computation for virtually moving the vehicle V in the direction to leave the target parking position P1 is performed according to a predetermined rule (S101), and whether a virtual frame of the vehicle V has collided with an obstacle is determined (S102). If the virtual frame of the vehicle V is determined to have collided with an obstacle, such position is determined as the reachable limit position C, and the gearshift of the vehicle V is switched from the D (drive) range to the R (reverse) range or from the R range to the D range so that the direction of travel of the vehicle V is switched back from forward drive to reverse drive or from reverse drive to forward drive (S107).

Then, whether the vehicle V has reached a predetermined candidate connection position D is determined (S103), and when the position Vo of the vehicle V has passed a candidate connection line PL, such position is set as the candidate connection position D, and the vehicle orientation Vf of the vehicle V at that position is stored (S108). Then, whether the vehicle V is at an angle of 90° [deg] with respect to the parking orientation 26 and the vehicle orientation Vf is in parallel with the road orientation 25 (i.e., whether the first condition is satisfied) is determined (S104), and if it is determined that the vehicle V is at an angle of 90° [deg] with respect to the parking orientation 26 and the vehicle orientation Vf is in parallel with and in the same orientation as the road orientation 25, the first condition is determined to be satisfied, and thus, the present routine terminates.

Meanwhile, if the vehicle orientation Vf of the vehicle V is not determined to be at an angle of 90° [deg] with respect to the parking orientation 26, whether the vehicle V has moved away from the parking space by a distance greater than or equal to a predetermined distance Hmax is determined (S105). In the present embodiment, the predetermined distance Hmax is set to 7 meters. If the vehicle V is determined to have moved by a distance greater than or equal to the predetermined distance Hmax, the second condition is determined to be satisfied, and thus, the present routine terminates.

As another method of setting candidate connection positions, the candidate connection position setting unit 12 may, each time the orientation of the vehicle V has changed by a predetermined relative angle (for example, every 5° [deg]) when the vehicle V is moved in the direction to leave the parking space along the pull-out path, set such position as a candidate connection position.

When the pull-out path is recomputed by the pull-out path computing unit 11, the candidate connection position setting unit 12 performs a process of resetting a plurality of candidate connection positions on the recomputed pull-out path.

<Reachable Path Computing Unit>

The reachable path computing unit 13 computes a reachable path that allows the vehicle V to reach at least one of the plurality of candidate connection positions D from the initial position P0 of the vehicle V. A "reachable path" is a path that allows the vehicle V to reach a candidate connection position D from the initial position P0 of the vehicle V through one of forward drive or reverse drive of the vehicle V, without switching between forward drive or reverse drive. Whether the vehicle V can reach the candidate connection position D is determined on the basis of the position Vo and vehicle orientation Vf of the vehicle V. If the position Vo of the vehicle V coincides with the candidate connection position D and the vehicle orientation Vf of the vehicle V coincides with the vehicle orientation Vf of the vehicle V stored in association with the candidate connection position D, it is determined that the vehicle V can reach the candidate connection position D. Computation of the reachable path is performed on the basis of information on the vehicle position and specifications of the vehicle V. Reachable paths are sequentially computed from the side of a candidate connection position D that involves a less number of switching of the direction of vehicle travel and is closer to the initial position P0 of the vehicle V.

If the vehicle V can be moved from the initial position P0 and arranged in a predetermined vehicle orientation Vf at one of the candidate connection positions D, then, the vehicle V can be moved into the parking space 20 by inversely following the pull-out path. Thus, the reachable path computing unit 13 sets, among the plurality of candidate connection positions D on the pull-out path, a candidate connection position D at which the vehicle V can be arranged in a predetermined vehicle orientation Vf from the initial position P0, as a park-out position B, and computes a reachable path of from the initial position P0 to the park-out position B.

Figure 8:
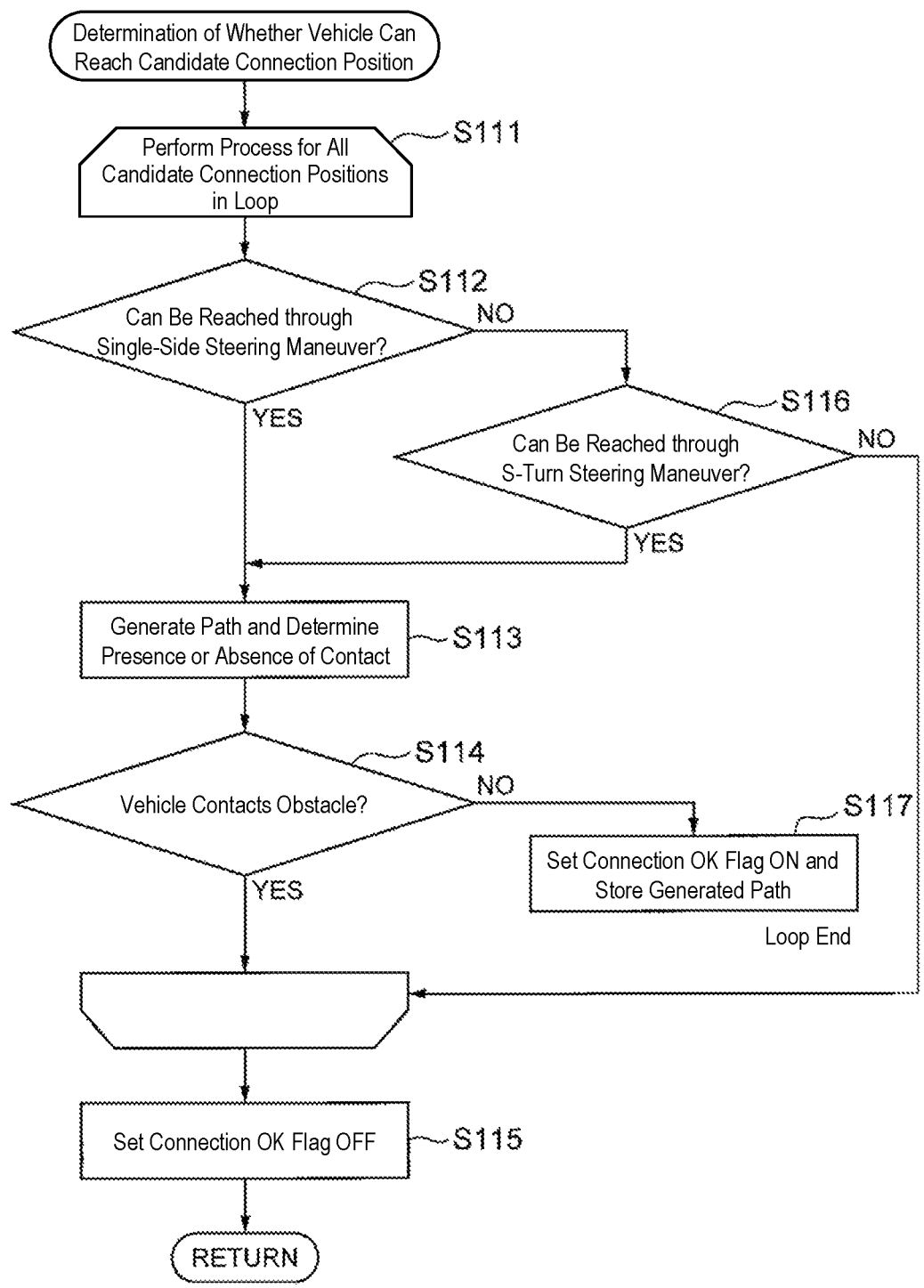
FIG. 8 is a process flow for determining whether a vehicle can reach a candidate connection position.

FIG. 8 is a process flow for determining whether the vehicle V can reach the candidate connection position D.

This process flow is performed for the total number of the candidate connection positions D in a loop (S111). First, whether the vehicle V can reach the nearest candidate connection position D from the initial position P0 through a single-side steering maneuver is determined (S112). The "single-side steering maneuver" as referred to herein is an operation of turning the steering wheel of the vehicle V to only one of the right or left side of the vehicle V. If it is determined that the vehicle V cannot reach the candidate connection position D through a single-side steering maneuver alone, then, whether the vehicle V can reach the candidate connection position D through an S-turn steering maneuver is determined (S116). The "S-turn steering maneuver" as referred to herein is an operation of turning the steering wheel of the vehicle V to both the right and left sides of the vehicle V.

If it is determined that the vehicle V can reach the candidate connection position D through a single-side steering maneuver or an S-turn steering maneuver, such candidate connection position D is selected as a park-out position B, and a reachable path of from the initial position P0 of the vehicle V to the park-out position B is generated (S113).

Then, whether the virtual frame of the vehicle V contacts an obstacle on the reachable path is determined (S114). If it is determined that the virtual frame of the vehicle V does not contact the obstacle, the connection OK flag is set ON and the generated reachable path is stored in a storage, and thus, the loop terminates (S117). Meanwhile, if it is determined that the vehicle V cannot reach the candidate connection position D through a single-side steering maneuver or an S-turn steering maneuver (NO in S112 and S116), or if it is determined that the virtual frame of the vehicle V contacts the obstacle (YES in S114), the determination for the relevant candidate connection position D terminates, and determination for the other remaining candidate connection positions D is performed. Then, if it is determined that the vehicle V cannot reach any of the candidate connection positions D, the connection OK flag is set OFF (S115), and the process flow terminates.

Figure 9A:
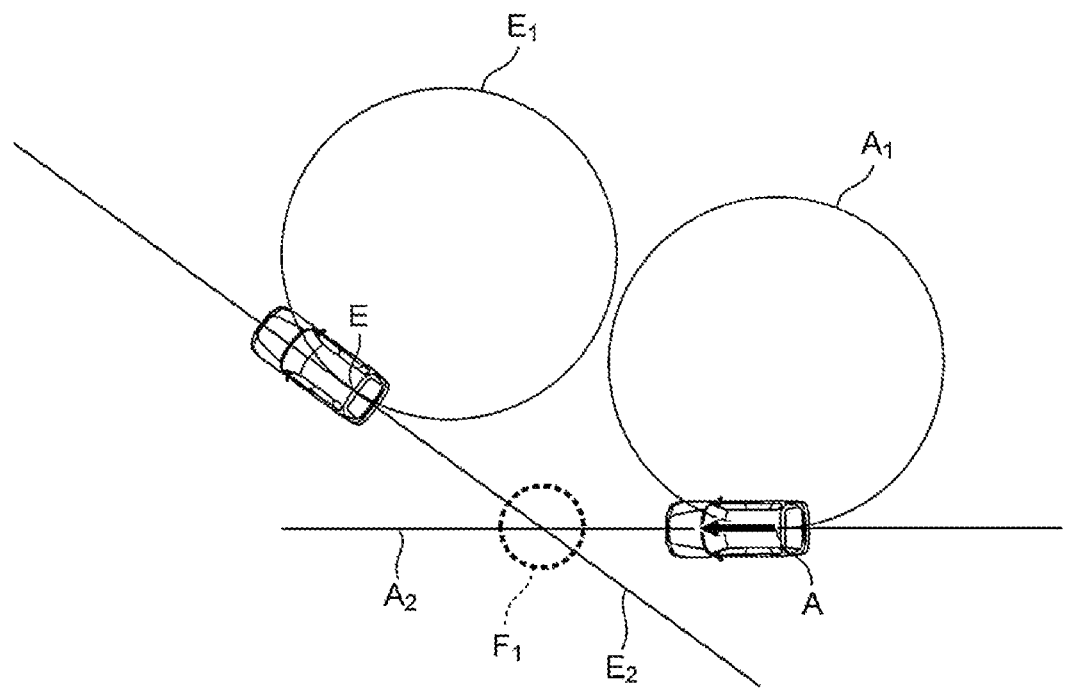
FIG. 9A illustrates an example of determination of whether the vehicle can reach the candidate connection position through a single-side steering maneuver.
Figure 9B:
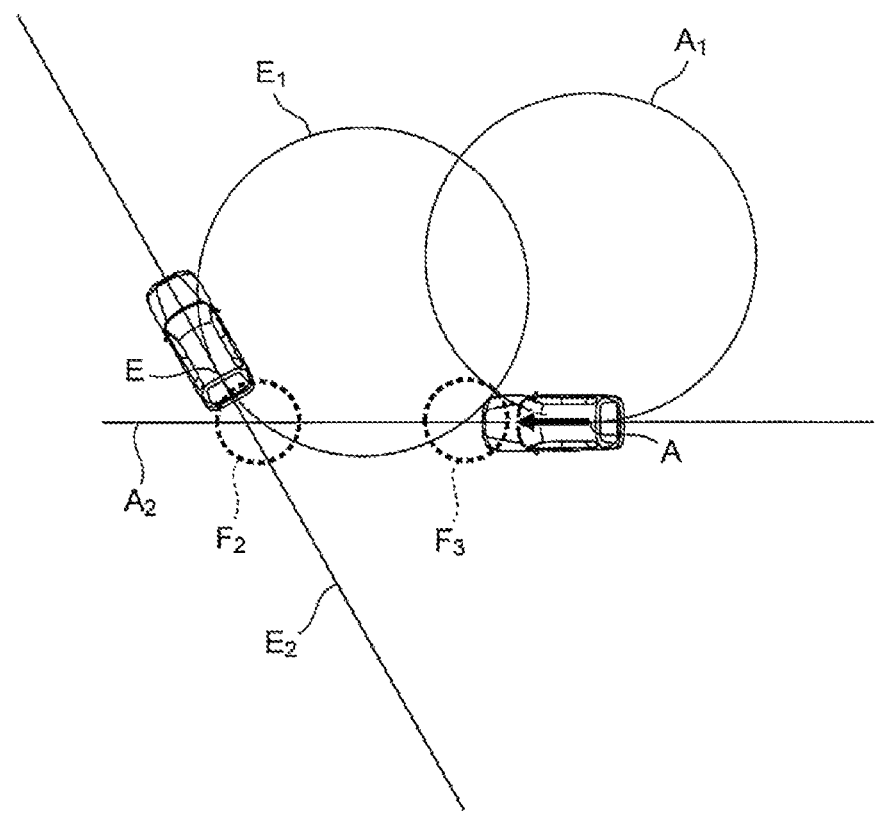
FIG. 9B illustrates an example of determination of whether the vehicle can reach the candidate connection position through a single-side steering maneuver.
Figure 9C:
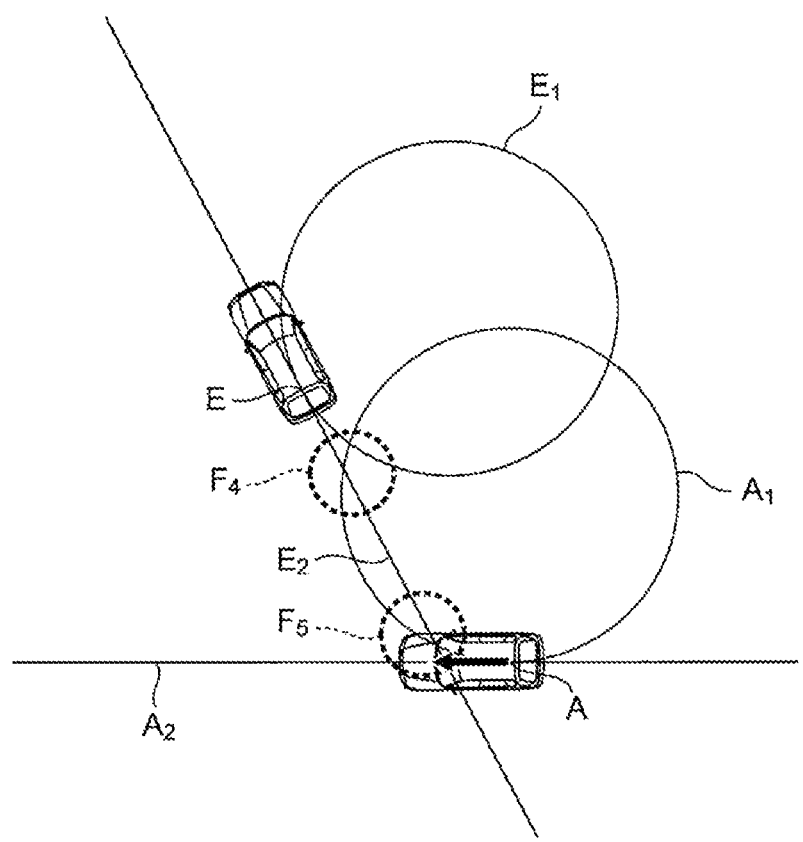
FIG. 9C illustrates an example of determination of whether the vehicle can reach the candidate connection position through a single-side steering maneuver.
Figure 9D:
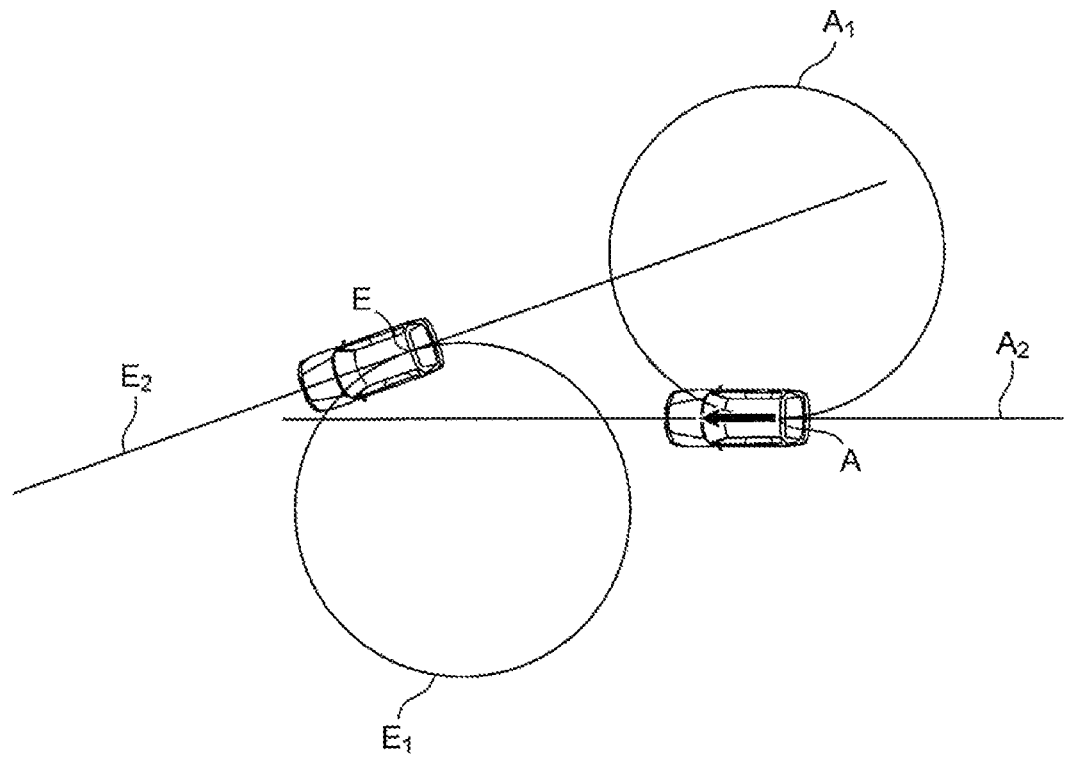
FIG. 9D illustrates an example of determination of whether the vehicle can reach the candidate connection position through an S-turn steering maneuver.
Figure 9E:
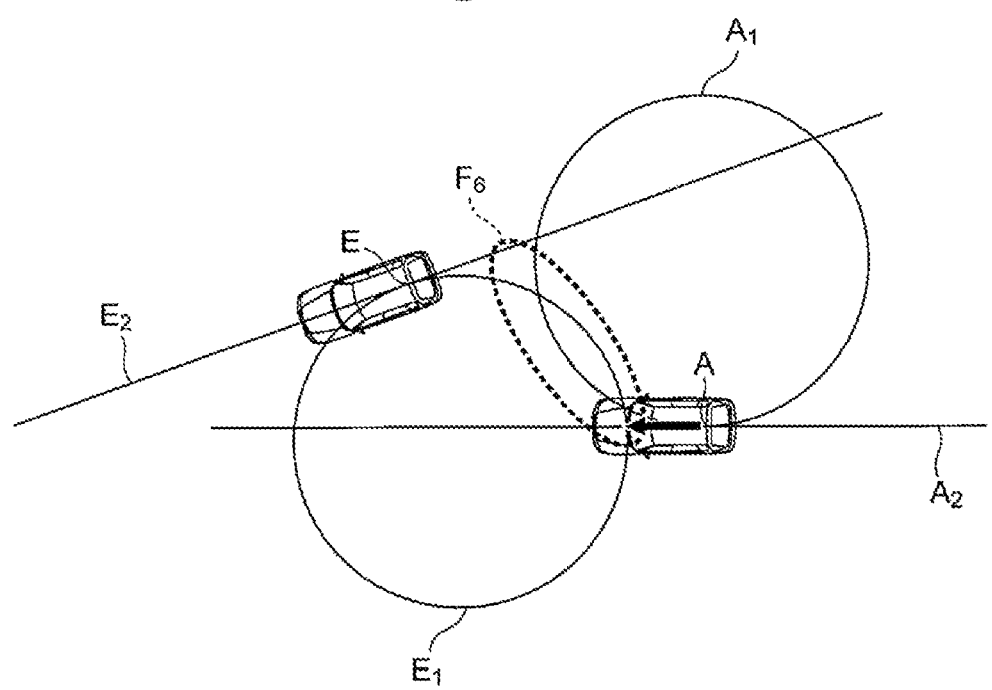
FIG. 9E illustrates an example of determination of whether the vehicle can reach the candidate connection position through an S-turn steering maneuver.

FIGS. 9A to 9C each illustrate an example of determination of whether the vehicle V can reach a candidate connection position through a single-side steering maneuver. FIGS. 9D and 9E each illustrate an example of determination of whether the vehicle V can reach a candidate connection position through an S-turn steering maneuver.

In the determination of whether the vehicle V can reach a candidate connection position through a single-side steering maneuver in S112, it is determined that the vehicle V can reach the candidate connection position if all of the following conditions (a1) to (a3) are satisfied (i.e., restrictions regarding the angular difference and positions are also imposed).

(a1) An axis A2 (vehicle orientation Vf) of the vehicle V at the current position A (i.e., initial position P0) intersects an axis E2 (vehicle orientation Vf) of the vehicle V at a candidate connection position E.

(a2) A turning circle A1 at the current position A does not intersect the axis E2 at the candidate connection position E.

(a3) A turning circle E1 at the candidate connection position E does not intersect the axis A2 at the current position A.

It should be noted that a "turning circle" herein means an arc on the turning side with the clothoid curve taken into consideration (i.e., minimum turning trajectory).

In the example illustrated in FIG. 9A, the aforementioned condition (a1) is satisfied since the axes A2 and E2 intersect at a position of intersection F1. In addition, the aforementioned conditions (a2) and (a3) are also satisfied. Therefore, it is determined that the vehicle V can reach the candidate connection position through a single-side steering maneuver. Meanwhile, in FIG. 9B, the aforementioned condition (a3) is not satisfied since the turning circle E1 intersects the axis A2. In addition, in the example illustrated in FIG. 9C, the aforementioned condition (a2) is not satisfied since the turning circle A1 intersects the axis E2. Therefore, in the example illustrated in FIGS. 9B and 9C, it is determined that the vehicle V cannot reach the candidate connection position through a single-side steering maneuver, and the process proceeds to determination of whether an S-turn steering maneuver is available.

In the determination of whether the vehicle V can reach the candidate connection position through an S-turn steering maneuver in S116, it is determined that the vehicle V can reach the candidate connection position if the following condition (a4) is satisfied (i.e., restrictions regarding the angular difference and positions are also imposed).

X-axis, which is the axis A2 at the current position A, at a position behind the candidate connection position E.

Herein, the radii R, which are identical, of the two turning circles E1 and A1 for depicting an S-shape are computed. Once the point of tangency between the two circles is determined, an S-shaped reachable path can be generated by combining the arc of the turning circle A1 and the arc of the turning circle E1.

Since the center coordinates of the two circles can be determined, the radius of each of the two circles can be determined from the distance between the center coordinates.

[Formula 2]

$$2R = \sqrt{(X_e - R\sin\theta)^2 + (Y_e + R\cos\theta + R)^2} \qquad (2)$$

[Formula 3]

$$R = \frac{X_e\sin\theta - Y_e(1 + \cos\theta) - \sqrt{\{X_e\sin\theta - Y_e(1 + \cos\theta)\}^2 - 2(\cos\theta - 1)(X_e^2 + Y_e^2)}}{2(\cos\theta - 1)} \qquad (3)$$

(a4) The turning circle A1 at the current position A and the turning circle E1 at the candidate connection position E do not intersect.

In the example illustrated in FIG. 9D, the aforementioned condition (a4) is satisfied since the turning circle A1 and the turning circle E1 do not intersect. Therefore, it is determined that the vehicle V can reach the candidate connection position through an S-turn steering maneuver. Meanwhile, in the example illustrated in FIG. 9E, the aforementioned condition (a4) is not satisfied since the turning circle A1 and the turning circle E1 intersect. Therefore, it is determined that the vehicle V cannot reach the candidate connection position through an S-turn steering maneuver.

Figure 10:
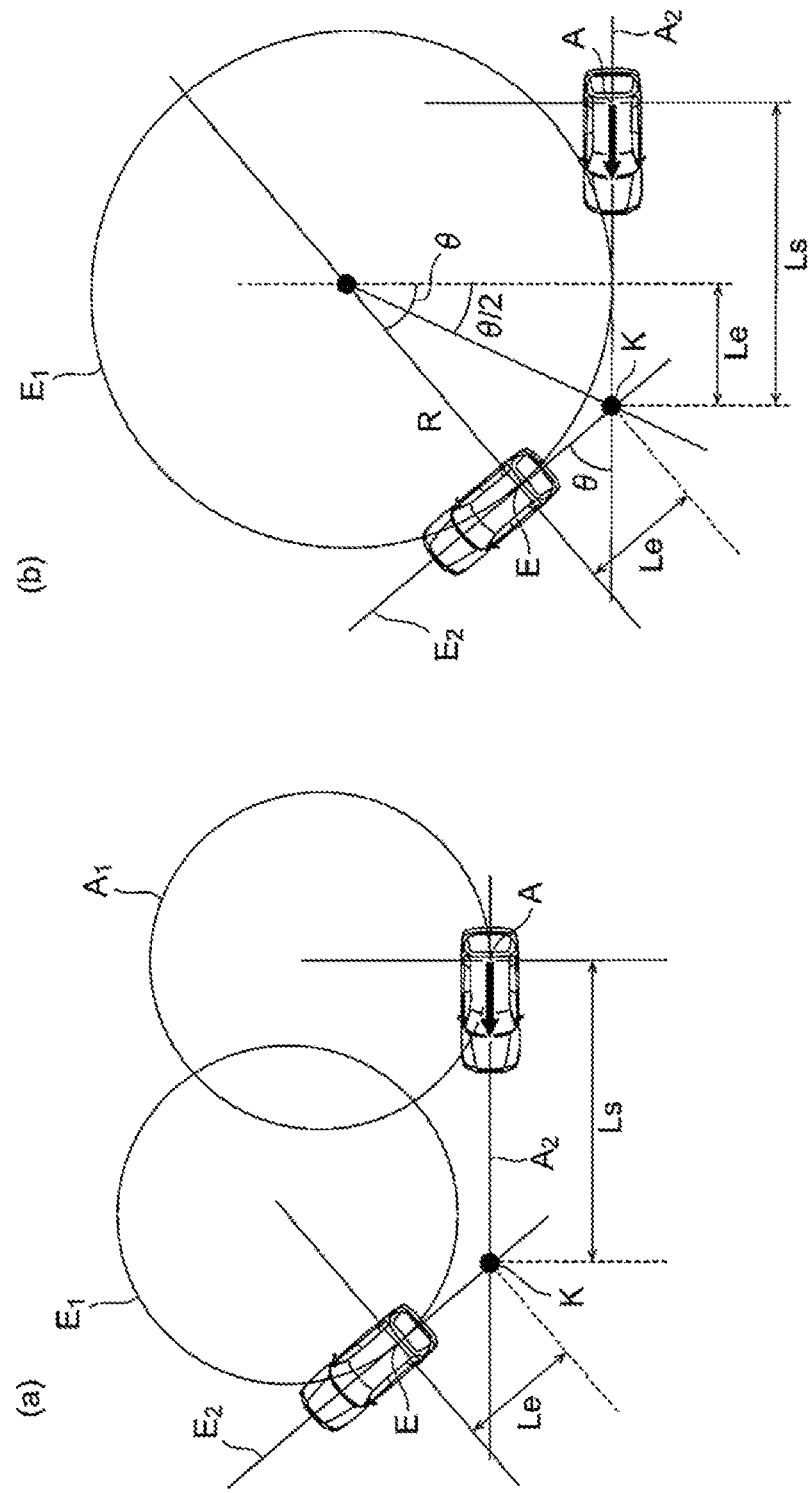
FIG. 10 illustrate a method of generating a reachable path that requires only a single-side steering maneuver.

FIG. 10 illustrate a method of generating a reachable path that requires only a single-side steering maneuver. To generate a reachable path of from the current position A to the candidate connection position E that requires only a single-side steering maneuver, first, as illustrated in FIG. 10(a), the distance Ls between the intersection K between the axis A2 and the axis E2 and the current position A, and the distance Le between the intersection K and the candidate connection position E are computed, and the shorter distance is selected (i.e., the distance Le is selected in the example illustrated in the drawing). Then, as illustrated in FIG. 12(b), a circle having both the two axes A2 and E2 as tangents and passing through a point that is away from the intersection K by the shorter distance is depicted, and the radius R of the circle is computed through geometric computation using Formula (1) below.

[Formula 1]

$$R = \frac{L_e}{\tan\frac{\theta}{2}} \qquad (1)$$

This can generate a reachable path that combines a straight line and an arc.

Figure 11:
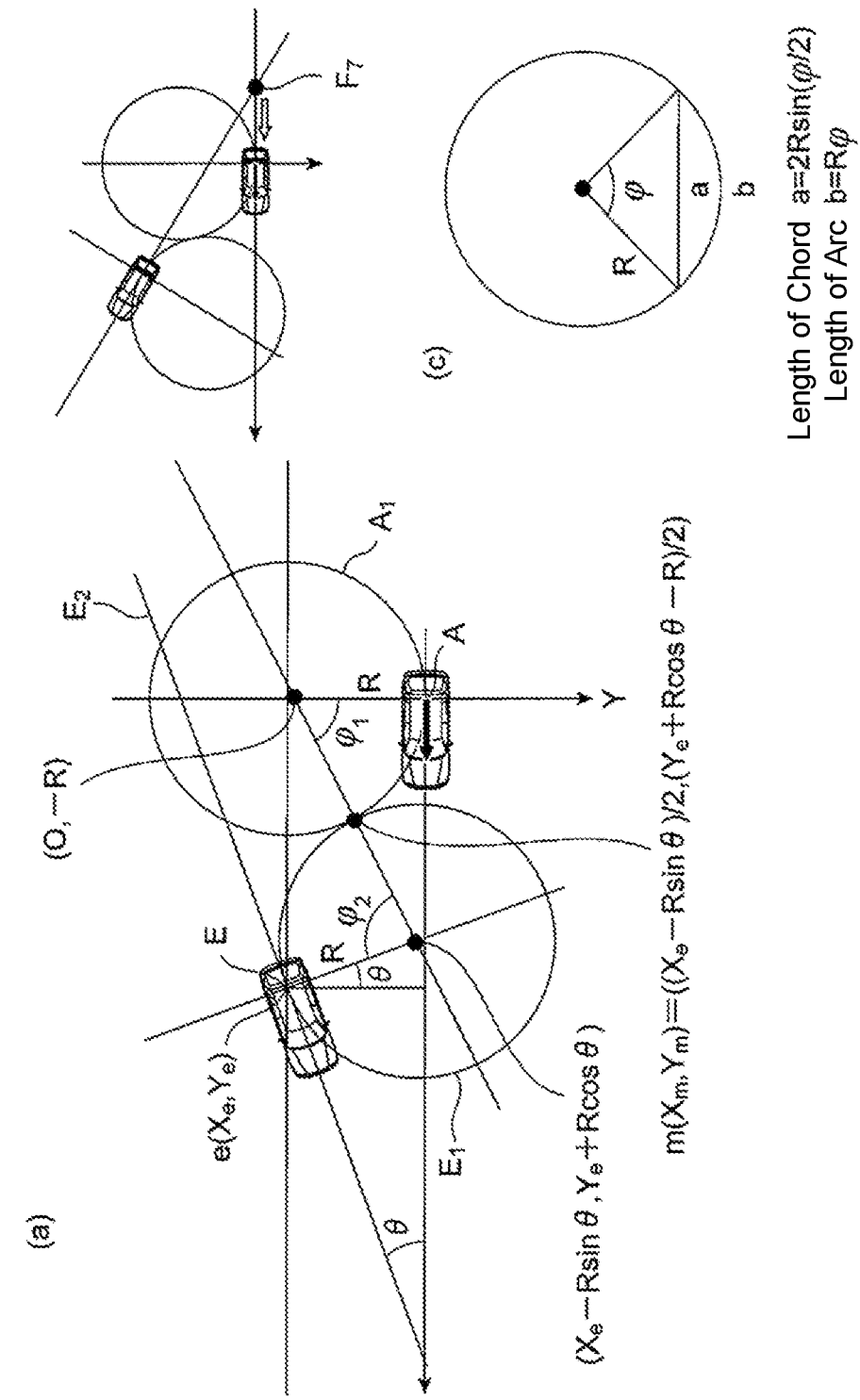
FIG. 11 illustrate a method of generating a reachable path that requires an S-turn steering maneuver.

FIG. 11 illustrate a method of generating a reachable path that requires an S-turn steering maneuver, and illustrate a generation method when the axis E2 does not intersect the It should be noted that when θ=0,

[Formula 4]

$$R = -\frac{X_e^2 + Y_e^2}{4Y_e} \qquad (4)$$

The position of the intersection illustrated in FIG. 11(a) to the position of the intersection F7 illustrated in FIG. 11(b) can be computed from the aforementioned computational formulae.

From the formulae shown in FIG. 11(c), the turning angles $\phi_1$ and $\phi_2$ and the arc lengths $b_1$ and $b_2$ of the two circle of the S-shape be determined using the following computational formulae.

[Formula 5]

$$\varphi_1 = 2\sin^{-1}\left(\frac{\sqrt{X_m^2 + Y_m^2}}{2R}\right) \qquad (5)$$

[Formula 6]

$$b_1 = 2R\sin^{-1}\left(\frac{\sqrt{X_m^2 + Y_m^2}}{2R}\right) \qquad (6)$$

[Formula 7]

$$\varphi_2 = 2\sin^{-1}\left(\frac{\sqrt{(X_m - X_e)^2 + (Y_m - Y_e)^2}}{2R}\right) \qquad (7)$$

[Formula 8]

$$b_2 = 2R\sin^{-1}\left(\frac{\sqrt{(X_m - X_e)^2 + (Y_m - Y_e)^2}}{2R}\right) \qquad (8)$$

Figure 12:
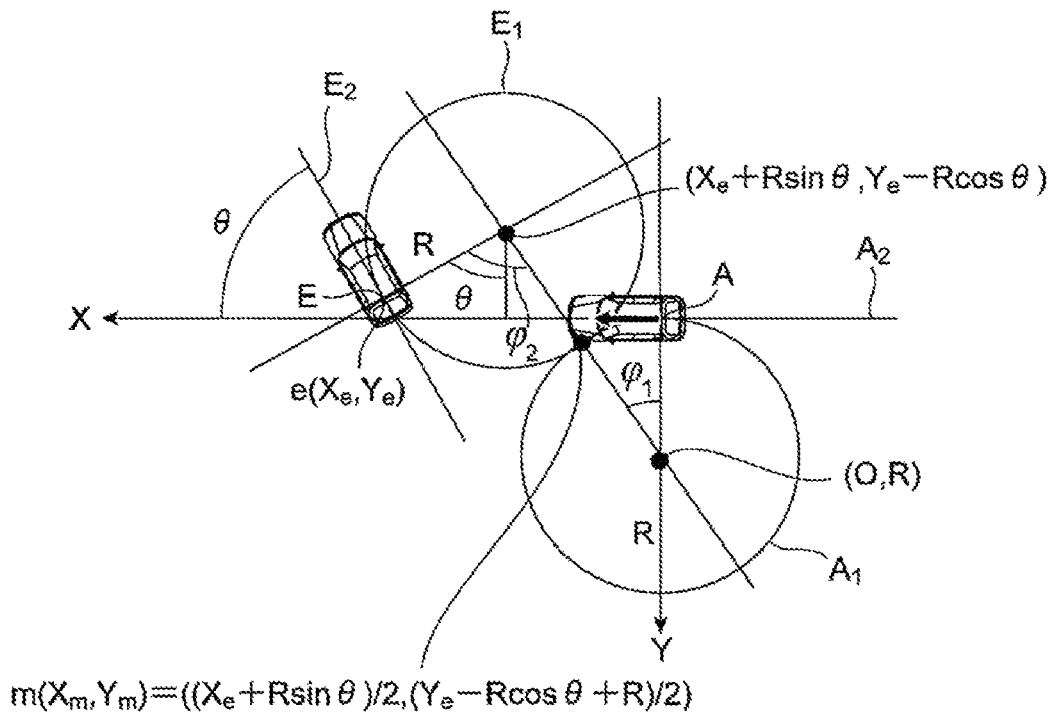
FIG. 12 illustrates a method of generating a reachable path that requires an S-turn steering maneuver.

FIG. 12 illustrates an exemplary method of generating a reachable path that requires an S-turn steering maneuver, and illustrates a generation method when the axis E2 intersects the X-axis, which is the axis A2 at the current position A, at a position behind the candidate connection position E.

Herein, the radii R, which are identical, of the turning circles E1 and A1 for depicting an S-shape are computed. Once the point of tangency between the two circles is determined, an S-shaped reachable path can be generated by combining the arc of the turning circle A1 and the arc of the turning circle E1.

Since the center coordinates of the two circles can be determined, the radius of each of the two circles can be determined from the distance between the center coordinates.

[Formula 9]

$$2R = \sqrt{(X_e + R\sin\theta)^2 + (Y_e - R\cos\theta - R)^2} \tag{9}$$

[Formula 10]

$$R = \frac{-\{X_e\sin\theta - Y_e(1 + \cos\theta)\} - \sqrt{\{X_e\sin\theta - Y_e(1 + \cos\theta)\}^2 - 2(\cos\theta - 1)(X_e^2 + Y_e^2)}}{2(\cos\theta - 1)} \tag{10}$$

From the formulae shown in FIG. 11(c), the turning angles $\phi_1$ and $\phi_2$ and the arc lengths $b_1$ and $b_2$ of the two circles of the S-shape can be determined using the following computational formulae.

[Formula 11]

$$\varphi_1 = 2\sin^{-1}\left(\frac{\sqrt{X_m^2 + Y_m^2}}{2R}\right) \tag{11}$$

[Formula 12]

$$b_1 = 2R\sin^{-1}\left(\frac{\sqrt{X_m^2 + Y_m^2}}{2R}\right) \tag{12}$$

[Formula 13]

$$\varphi_2 = 2\sin^{-1}\left(\frac{\sqrt{(X_m - X_e)^2 + (Y_m - Y_e)^2}}{2R}\right) \tag{13}$$

[Formula 14]

$$b_2 = 2R\sin^{-1}\left(\frac{\sqrt{(X_m - X_e)^2 + (Y_m - Y_e)^2}}{2R}\right) \tag{14}$$

Figure 13:
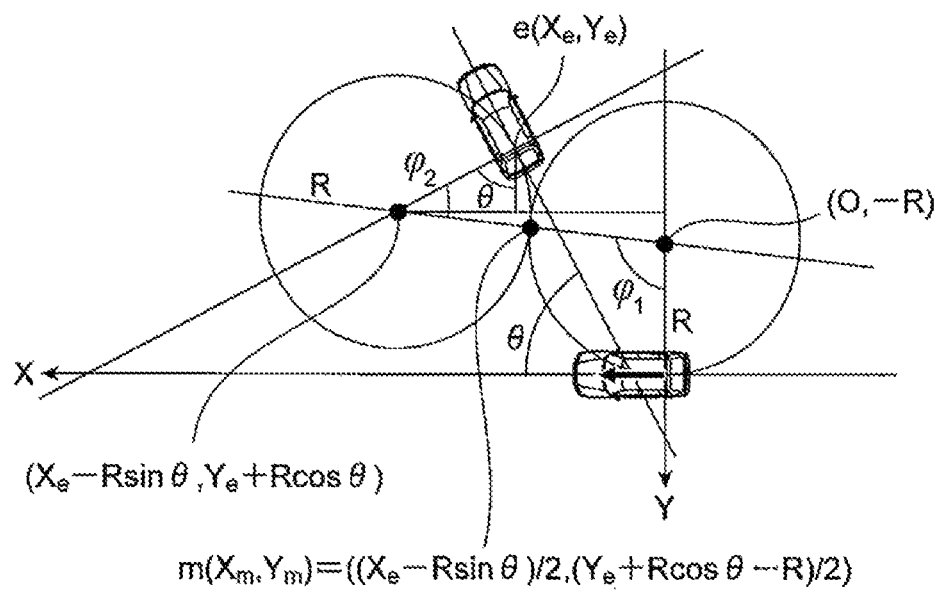
FIG. 13 illustrates a method of generating a reachable path that requires an S-turn steering maneuver.

FIG. 13 illustrates a method of generating a reachable path that requires an S-turn steering maneuver, and illustrates a generation method when the axis E2 intersects the X-axis, which is the axis A2 at the current position A, at a position behind the candidate connection position E.

Herein, the radii R, which are identical, of the turning circles E1 and A1 for depicting an S-shape are computed. Once the point of tangency between the two circles is determined, an S-shaped reachable path can be generated by combining the arc of the turning circle A1 and the arc of the turning circle E1.

Since the center coordinates of the two circles can be determined, the radius of each of the two circles can be determined from the distance between the center coordinates.

[Formula 15]

$$2R = \sqrt{(X_e - R\sin\theta)^2 + (Y_e + R\cos\theta + R)^2} \tag{15}$$

-continued

[Formula 16]

$$R = \frac{X_e\sin\theta - Y_e(1+\cos\theta) - \sqrt{\{X_e\sin\theta - Y_e(1+\cos\theta)\}^2 - 2(\cos\theta-1)(X_e^2+Y_e^2)}}{2(\cos\theta-1)} \quad (16)$$

From the formulae shown in FIG. 11(c), the turning angles $\phi_1$ and $\phi_2$ and the arc lengths $b_1$ and $b_2$ of the two circles of the S-shape can be determined using the following computational formulae.

[Formula 17]

$$\varphi_1 = 2\sin^{-1}\left(\frac{\sqrt{X_m^2+Y_m^2}}{2R}\right) \quad (17)$$

[Formula 18]

$$b_1 = 2R\sin^{-1}\left(\frac{\sqrt{X_m^2+Y_m^2}}{2R}\right) \quad (18)$$

[Formula 19]

$$\varphi_2 = 2\sin^{-1}\left(\frac{\sqrt{(X_m-X_e)^2+(Y_m-Y_e)^2}}{2R}\right) \quad (19)$$

[Formula 20]

$$b_2 = 2R\sin^{-1}\left(\frac{\sqrt{(X_m-X_e)^2+(Y_m-Y_e)^2}}{2R}\right) \quad (20)$$

<Parking Path Setting Unit>

The parking path setting unit 14 sets a parking path using information on the pull-out path of from the target parking position P1 to the park-out position B and information on the reachable path of from the initial position P0 of the vehicle V to the park-out position B. The parking path setting unit 14 forms a parking path by connecting the reachable path, which has been generated by setting the connection OK flag ON in step S117 of FIG. 8, and the pull-out path including the park-out position B connecting to the reachable path.

As described above, the parking assistance device 1 computes a pull-out path from the target parking position P1, and selects, from among a plurality of candidate connection positions D set on the pull-out path, a candidate connection position D that can be reached by the vehicle at the initial position P0 and is closest to the initial position P0 as the park-out position B, and then sets a parking path using the pull-out path of from the target parking position P1 to the park-out position B and the reachable path of from the initial position P0 of the vehicle V to the park-out position B. Therefore, a parking path that includes switching of the direction of vehicle travel for guiding the vehicle V to the target parking position P1 is computed independently of the start position or vehicle attitude when parking assistance is started, and the vehicle V can be parked at the position intended by the driver and in a correct vehicle attitude.

Next, resetting of the parking path will be described.

The parking assistance device 1 according to the present embodiment can compute a parking path for guiding the vehicle V into the parking space 20, arranging the position Vo of the vehicle V at the target parking position P1 in the parking space 20, and allowing the vehicle orientation Vf of the vehicle V to coincide with the parking orientation 26. However, when the vehicle V is actually moved along the parking path, obstacles that have not been detected during the setting of the parking path by the parking path setting unit 14 may be detected due to various factors, such as the accuracy or errors of a sensor, and movement of the obstacles.

Figure 14A:
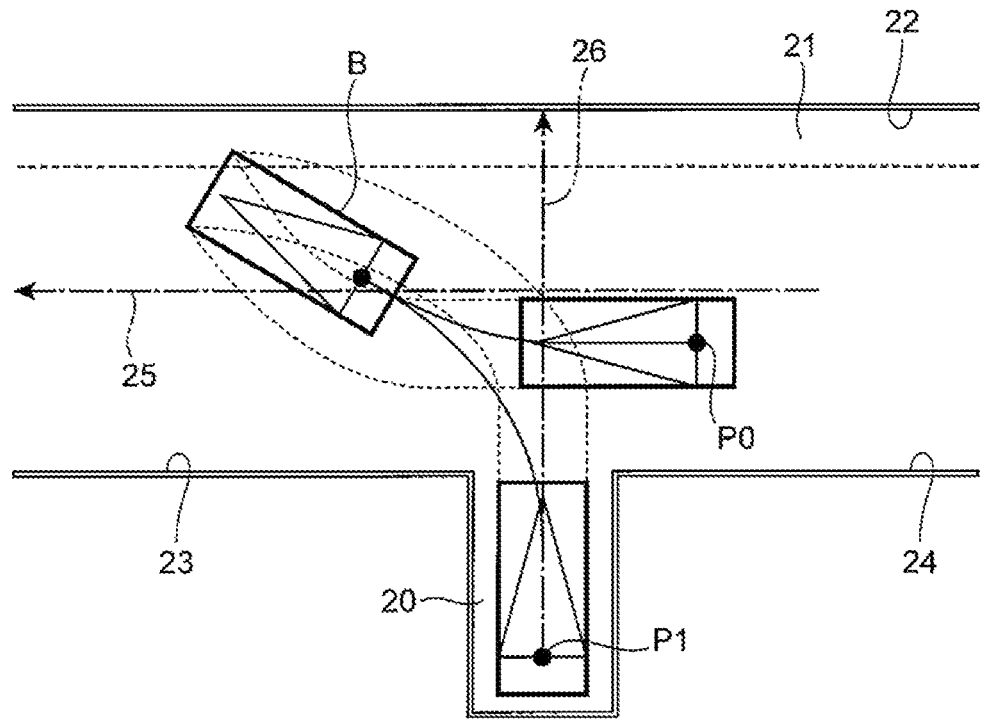
FIG. 14A illustrates a parking path of from the initial position to the target parking position.
Figure 14B:
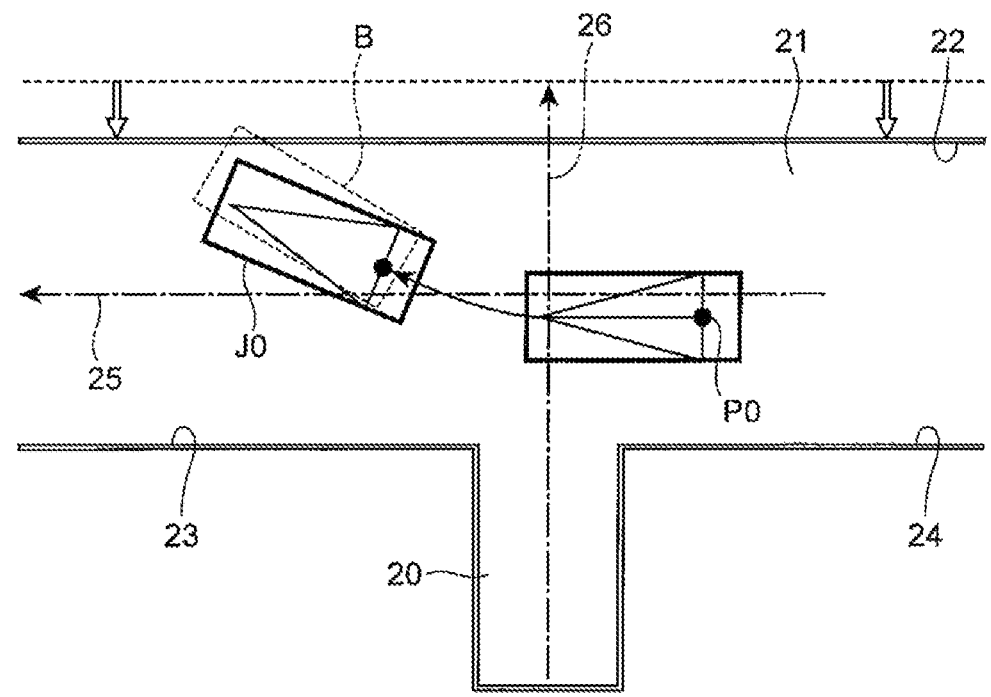
FIG. 14B illustrates the state of the vehicle that has stopped moving on the parking path.

FIG. 14A illustrates a parking path of from the initial position to the target parking position. FIG. 14B illustrates the state of the vehicle that has stopped moving on the parking path.

When a parking path was set by the parking path setting unit 14, the obstacle 22 was detected at a position away from the parking space 20 as illustrated in FIG. 14A. Therefore, a park-out position B was set on the basis of the detection result, and a parking path passing through the park-out position B was set. However, if information on obstacles is updated while the vehicle V is moved along the parking path and it is found that the obstacle 22 is actually present on the parking path near the parking space 20, the vehicle V will stop at the stop position J0 in front of the obstacle 22 and thus cannot reach the park-out position B.

The parking assistance device 1 according to the present embodiment assists in parking the vehicle V in the parking space 20 by, if the obstacle 22 is present on the parking path, resetting the parking path. Although the following description illustrates an example of back-in perpendicular parking, the present embodiment is similarly applicable to front-in perpendicular parking.

<Path Resetting Unit>

When the vehicle V has stopped moving due to an obstacle on the parking path, the path resetting unit 15 computes a parking path of from the stop position J0 of the vehicle V to the target parking position P1, and sets it as a new parking path. The path resetting unit 15 recomputes the parking path using information on the pull-out path recomputed by the pull-out path computing unit 11 and information on candidate connection positions reset by the candidate connection position setting unit 12.

When the vehicle V has stopped moving due to an obstacle on the parking path, the pull-out path computing unit 11 recomputes the pull-out path for pulling out the vehicle V out of the parking space 20 on the basis of information on the parking space and constraint conditions regarding vehicle behavior when the vehicle V stopped moving. Then, the candidate connection position setting unit 12 resets a plurality of candidate connection positions on the pull-out path recomputed by the pull-out path computing unit 11. Recomputation of the pull-out path by the pull-out path computing unit 11 differs from the aforementioned computing method only in the information on obstacles. Thus, the detailed description thereof is omitted. Similarly, resetting of the candidate connection positions by the candidate connection position setting unit 12 differs from the aforementioned setting method only in that the candidate connection positions are set on the recomputed pull-out path. Thus, the detailed description thereof is omitted.

After the pull-out path is recomputed by the pull-out path computing unit 11 and the candidate connection positions are reset by the candidate connection position setting unit 12, the path resetting unit 15 computes a parking path of from the stop position J0 of the vehicle V to the parking space 20 using information on the pull-out path and the candidate connection positions, and sets the computed parking path as a new parking path. The parking path of from the stop position J0 of the vehicle V to the parking space 20 includes a connection path of from the stop position J0 to the park-out position B' and a pull-out path of from the target parking position P1 to the park-out position B'.

The connection path is computed as a path for moving the vehicle V from the stop position J0 to a separated position J1 that is away from the stop position J0 by switching the gearshift of the vehicle V from the D (drive) range to the R (reverse) range or from the R range to the D range at the stop position J0 so that the vehicle V can reach one of the plurality of candidate connection positions reset by the candidate connection position setting unit 12 from the separated position J1. The connection path is a path starting from the stop position J0 through reverse drive if the vehicle V has moved forward to the stop position J0 along the initial parking path set by the parking path setting unit 14, or is a path starting from the stop position J0 through forward drive if the vehicle V has backed up to the stop position JP along the initial parking path. The separated position J1 is a position at which, when the vehicle V is moved in the direction away from the stop position J0, the virtual frame of the vehicle V contacts an obstacle at the movement destination of the vehicle V. However, the position of the separated position J1 is limited regarding the positions outside a predetermined range.

Whether the vehicle V can reach one of the plurality of reset candidate connection positions from the separated position J1 is determined on the basis of the position Vo and vehicle orientation Vf of the vehicle V. If the position Vo of the vehicle V coincides with one of the plurality of reset candidate connection positions and the vehicle orientation Vf of the vehicle V coincides with the vehicle orientation Vf stored in association with the candidate connection position D, it is determined that the vehicle V can reach the candidate connection position. Whether the vehicle V can reach one of the plurality of reset candidate connection positions is sequentially determined from the side of a reset candidate connection position that involves a less number of switching of the direction of vehicle travel on the pull-out path and is closer to the separated position J1. Then, the reset candidate connection position that can be reached from the separated position J1 is set as the park-out position B'.

A path of from the separated position J1 to the park-out position B' on the connection path is a path that can be reached through only one of forward drive or reverse drive using a single-side steering maneuver or an S-turn steering maneuver without switching between forward drive and reverse drive, and is computed in a similar manner to the method of computing a path of from the initial position P0 to the park-out position B with the reachable path computing unit 13. The path resetting unit 15 computes a parking path of from the stop position J0 of the vehicle V to the parking space 20 by connecting the connection path of from the stop position J0 to the park-out position B' and the pull-out path of from the target parking position P1 to the park-out position B', and sets the computed parking path as a new parking path.

The path resetting unit 15 computes a plurality of parking paths, and selects one of them on the basis of a predetermined evaluation function, and then sets the selected parking path as a new parking path. The path resetting unit 15 computes as the plurality of parking paths the following three paths: (1) a path for starting movement of the vehicle while turning the vehicle to the right, (2) a path for starting movement of the vehicle while turning the vehicle to the left, and (3) a path for starting movement of the vehicle straight along the vehicle orientation Vf. Then, the path resetting unit 15 selects one of the three paths on the basis of the evaluation function and sets it as a new parking path.

The evaluation function is set using at least one of a movement time for moving the vehicle V along the reset parking path, a movement distance, an amount of turn, a parking environment, such as the presence or absence of another vehicle behind the vehicle V or the width of the road, the accuracy of parking, energy needed for parking, or user's needs, such as a preference of a driver. For example, the accuracy of the parking position is higher when the vehicle V moves straight into the parking space 20 after the orientation of the vehicle V has been aligned with the parking orientation 26 than when the vehicle enters the parking space 20 while turning. Therefore, when the accuracy of the parking position is prioritized, an evaluation function is set that selects a parking path for allowing the vehicle V to move straight into the parking space 20 after the orientation of the vehicle V has been aligned with the parking orientation 26.

In addition, when the vehicle V is parked into the parking space 20 from the park-out position B, for example, the time needed for parking can be shortened as the number of switching of the direction of vehicle travel between forward drive and reverse drive as well as the number of steering maneuvers is smaller. Therefore, to shorten the time needed for parking, an evaluation function is set that selects a parking path requiring a less number of switching of the direction of vehicle travel between forward drive and reverse drive as well as less steering maneuvers as much as possible.

Further, when parking the vehicle V, for example, the driver's intention to park the vehicle V in the parking space 20 can be more clearly conveyed to another vehicle behind the vehicle V when the vehicle V is at a position closer to the parking space 20 than when the vehicle V moves to a position away from the parking space 20. Thus, it is possible to avoid another vehicle behind from getting parked in the target parking space 20 earlier than the vehicle V. Therefore, when there is another vehicle behind the vehicle V on the road 21, an evaluation function is set that selects a parking path for allowing the vehicle V to be closer to the parking space 20, though it requires more switching of the direction of vehicle travel and more steering maneuvers.

The separated position J1 is set at a position where, when the vehicle V is moved while being turned to the right or left so that the vehicle orientation Vf of the vehicle V becomes parallel with and in the same orientation as the parking orientation 26, the virtual frame of the vehicle V contacts an obstacle at the movement destination of the vehicle V within the range of the parking orientation 26 as a limit, or is set at a position where, when the vehicle V is moved so that the vehicle orientation Vf of the vehicle V becomes parallel with and in the same orientation as the road orientation 25, the virtual frame of the vehicle V contacts an obstacle at the movement destination of the vehicle V within the range of the road orientation 25 as a limit.

For example, if the vehicle orientation Vf of the vehicle V has become parallel with and in the same orientation as the parking orientation 26 before the virtual frame of the vehicle V contacts an obstacle as a result of the vehicle V having been moved while being turned to the right or left so that the vehicle orientation Vf of the vehicle V becomes parallel with and in the same orientation as the parking orientation 26, such position is set as the separated position J1. Similarly, if the vehicle orientation Vf of the vehicle V has become parallel with and in the same orientation as the road orientation 25 before the virtual frame of the vehicle V contacts an obstacle as a result of the vehicle V having been moved while being turned to the right or left so that the vehicle orientation Vf of the vehicle V becomes parallel with and in the same orientation as the road orientation 25, such position is set as the separated position J1.

In addition, the separated position J1 is set at a position where, in the case of the path for starting movement of the vehicle V straight along the vehicle orientation Vf, the virtual frame of the vehicle V contacts an obstacle at the movement destination of the vehicle V within the range of a predetermined distance from the stop position J0 as a limit. Thus, if the vehicle V has moved away from the stop position J0 by a distance greater than or equal to the predetermined distance before the virtual frame of the vehicle V contacts an obstacle as a result of the vehicle V having been moved from the stop position J0 straight in the direction away from the stop position J0 along the vehicle orientation Vf, for example, the position that is away from the stop position J0 by the predetermined distance is set as the separated position J1.

Figure 15:
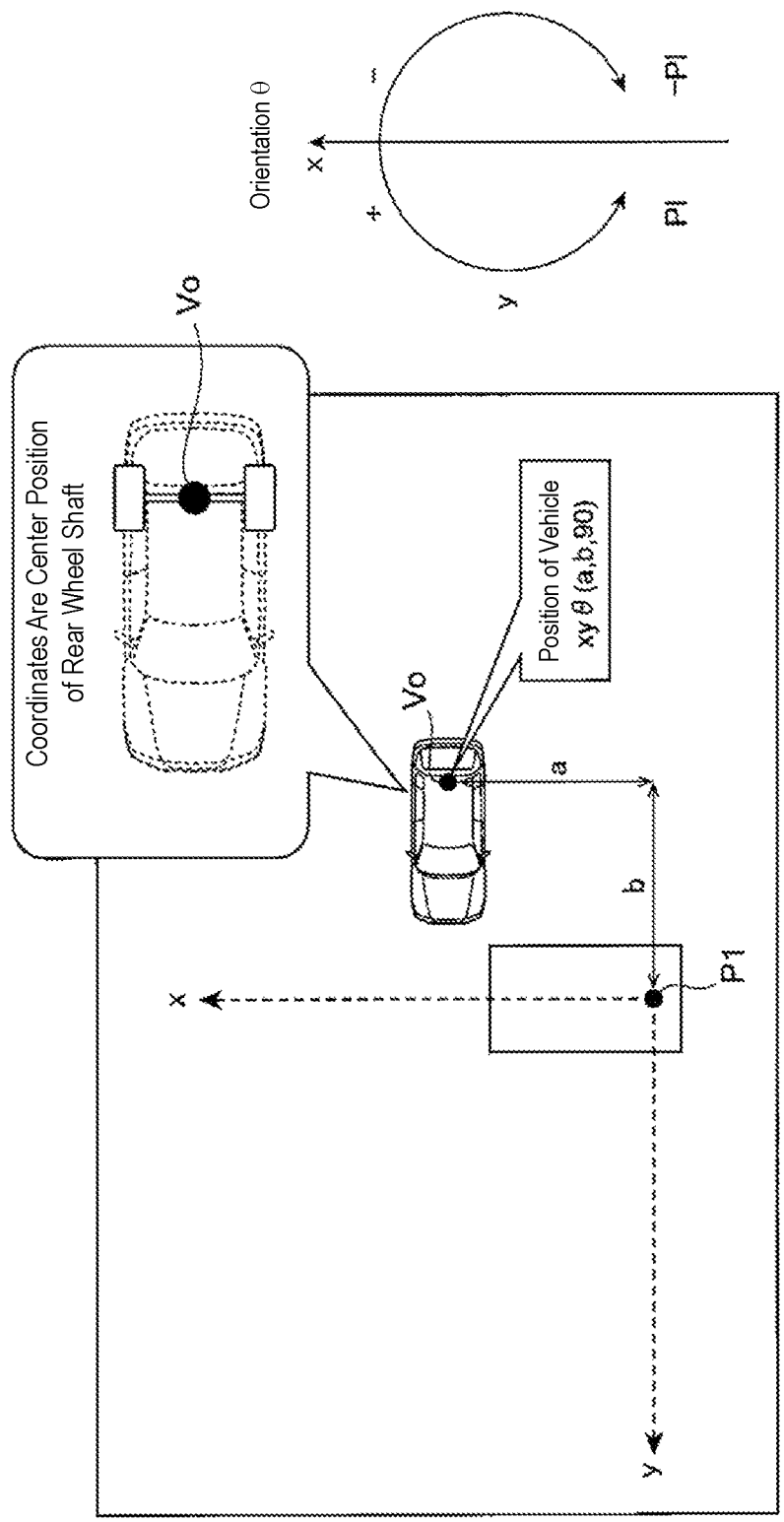
FIG. 15 illustrates the coordinate position of the vehicle with respect to the road orientation and the parking orientation.

FIG. 15 illustrates a coordinate system having the target parking position as the origin.

The coordinate system has the target parking position P1 as the origin, and the parking orientation is set as the X-axis and the road orientation is set as the Y-axis. In addition, the X-axis is the orientation θ=0, and a counterclockwise angle is indicated by a plus sign (+), while a clockwise angle is indicated by a minus sigh (−). The position Vo of the vehicle V can be represented by xyθ(a,−b,90) on the coordinate system.

For example, a path when the vehicle V is moved in the direction in which the vehicle orientation Vf of the vehicle V becomes parallel with and in the same orientation as the road orientation 25 corresponds to, on the aforementioned coordinate system, a path for moving the vehicle V while turning it in the direction in which the vehicle orientation Vf of the vehicle V becomes closer to 90°, and the back-up position J1 at that time is set within the range of the vehicle orientation Vf of the vehicle V of 90° as a limit. Meanwhile, a path when the vehicle V is moved in the direction in which the vehicle orientation Vf of the vehicle V becomes parallel with and in the same orientation as the parking orientation 26 corresponds to, on the aforementioned coordinate system, a path for moving the vehicle V while turning it in the direction in which the vehicle orientation Vf of the vehicle V becomes closer to 0°, and the back-up position J1 at that time is set within the range of the vehicle orientation Vf of the vehicle V of 0° as a limit.

Next, specific examples of the parking path for starting movement of the vehicle V while turning it to the right, the parking path for starting movement of the vehicle V while turning it to the left, and the parking path for starting movement of the vehicle V straight will be described with reference to FIGS. 16 to 23. The examples illustrated in FIGS. 16 to 23 each show the state of back-in perpendicular parking in which the vehicle V is reverse parked in the parking space 20 that is provided on the left side of the road 21.

Figure 16:
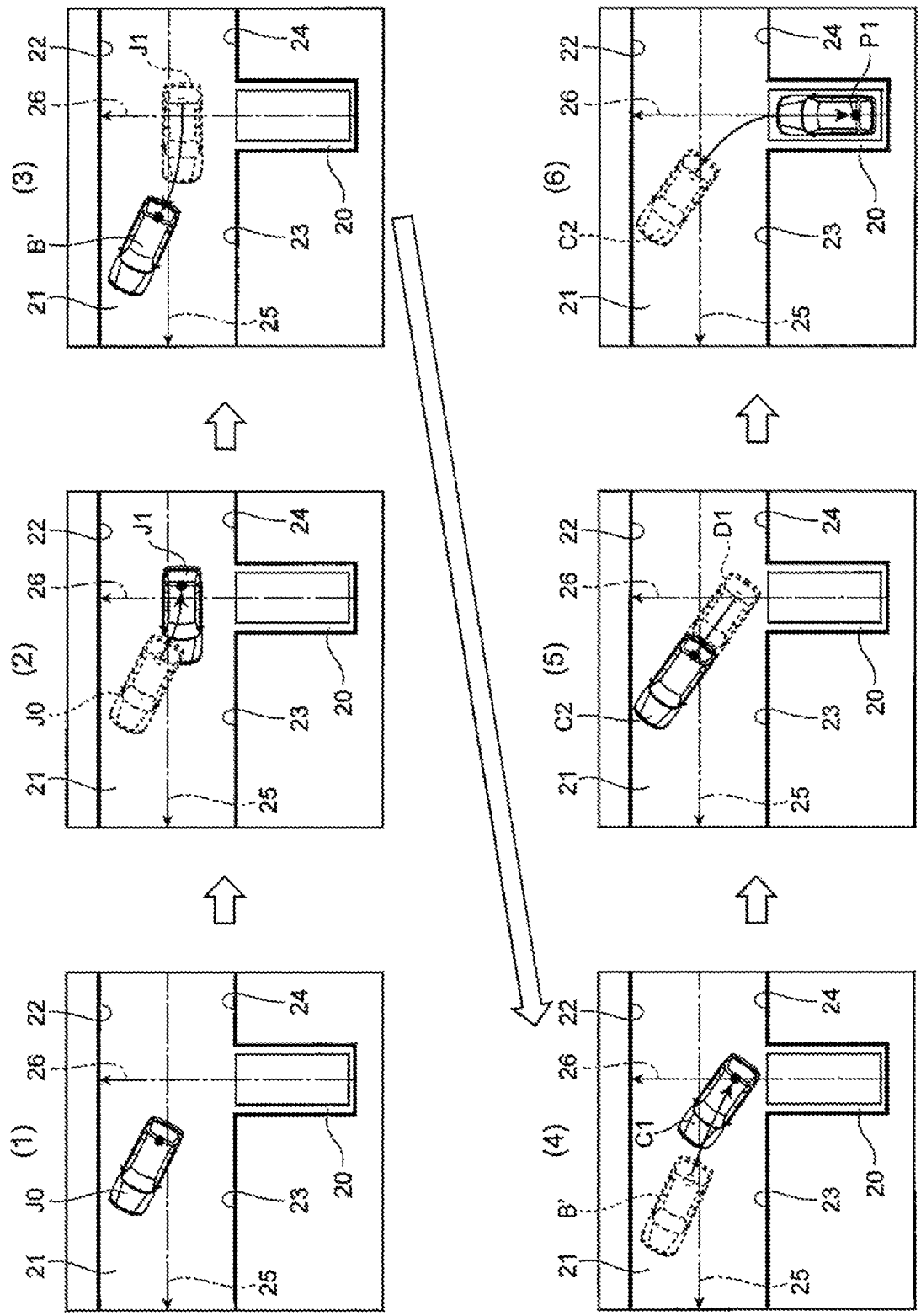
FIG. 16 illustrate a parking path that uses a connection path for backing up the vehicle while turning it to the right.
Figure 17:
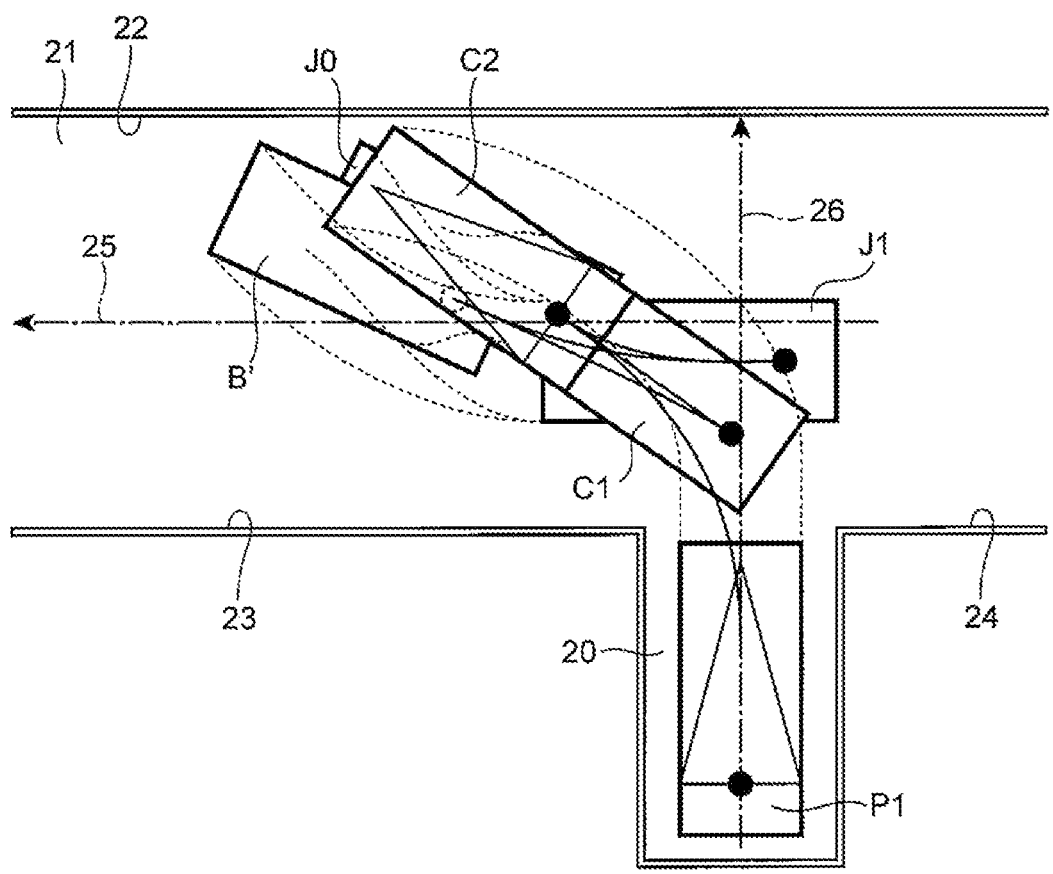
FIG. 17 illustrates a back-up position and a park-out position on the parking path illustrated in FIG. 16.

FIG. 16 illustrate an example of the parking path for starting movement of the vehicle V while turning it to the right, and FIG. 17 schematically illustrates the parking path illustrated in FIG. 16.

The parking path for starting movement of the vehicle while turning it to the right includes a path for starting backing up the vehicle V from the stop position J0 while turning the vehicle V to the right (FIG. 16(1)), backing up the vehicle V to the back-up position J1 (FIG. 16(2)), moving the vehicle V forward from the back-up position J1 to the park-out position B' (FIG. 16(3)), backing up the vehicle V from the park-out position B' to a reachable limit position C1 behind (FIG. 16(4)), moving the vehicle V forward from the reachable limit position C1 to a reachable limit position C2 ahead (FIG. 16(5)), and backing up the vehicle V from the reachable limit position C2 to the target parking position P1 (FIG. 16(6)).

In the example illustrated in FIGS. 16 and 17, a position at which the vehicle orientation Vf of the vehicle V becomes parallel with and in the same orientation as the road orientation 25 as a result of the vehicle V having been started backing up from the stop position J0 while being turned to the right is set as the separated position J1. Then, a candidate connection position that can be reached from the back-up position J1 through a single-side steering maneuver or an S-turn steering maneuver is selected as the park-out position B' from among the plurality of reset candidate connection positions. Therefore, a connection path is computed that allows the vehicle V to start backing up from the stop position J0 while being turned to the right so as to move to the separated position J1 and then reach the park-out position B' from the separated position J1. In addition, a pull-out path of from the target parking position P1 to the park-out position B' is used. Therefore, once the connection path and the pull-out path are connected at the park-out position B', a parking path of from the stop position J0 of the vehicle to the target parking position P1 in the parking space 20 can be computed.

Figure 18:
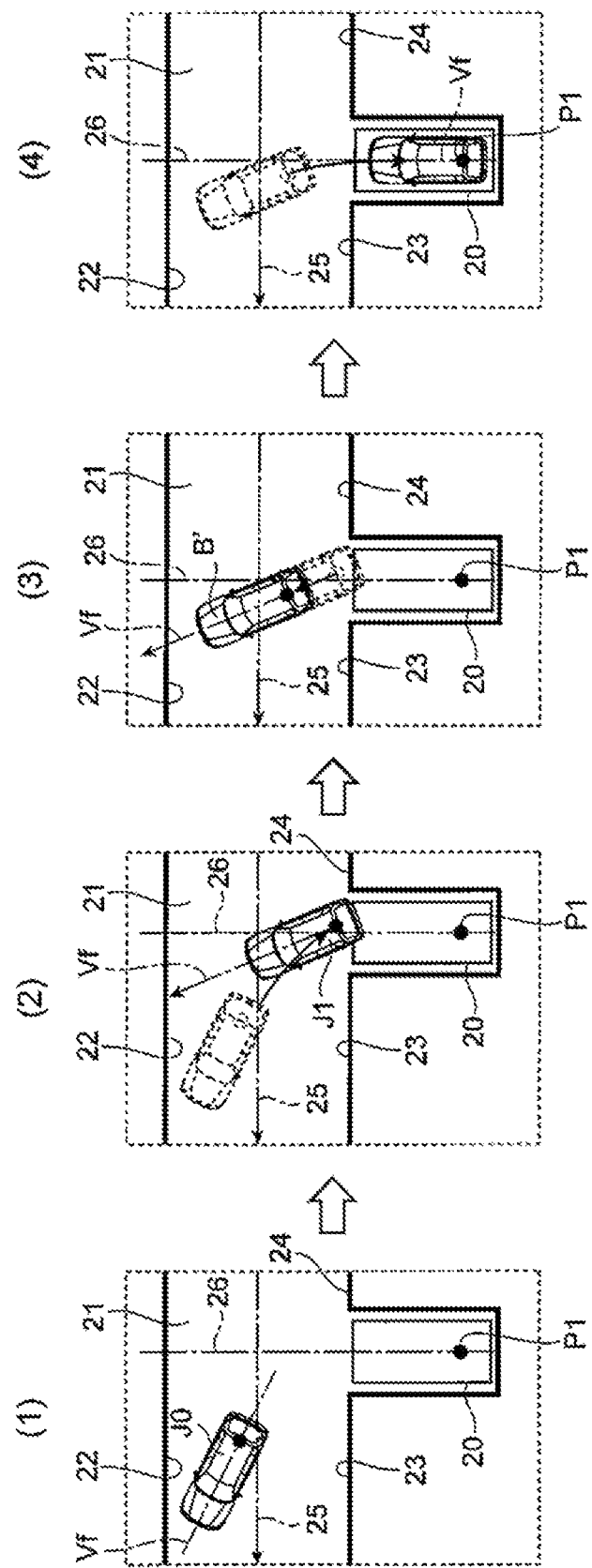
FIG. 18 illustrate a parking path that uses a connection path for backing up the vehicle while turning it to the left.
Figure 19:
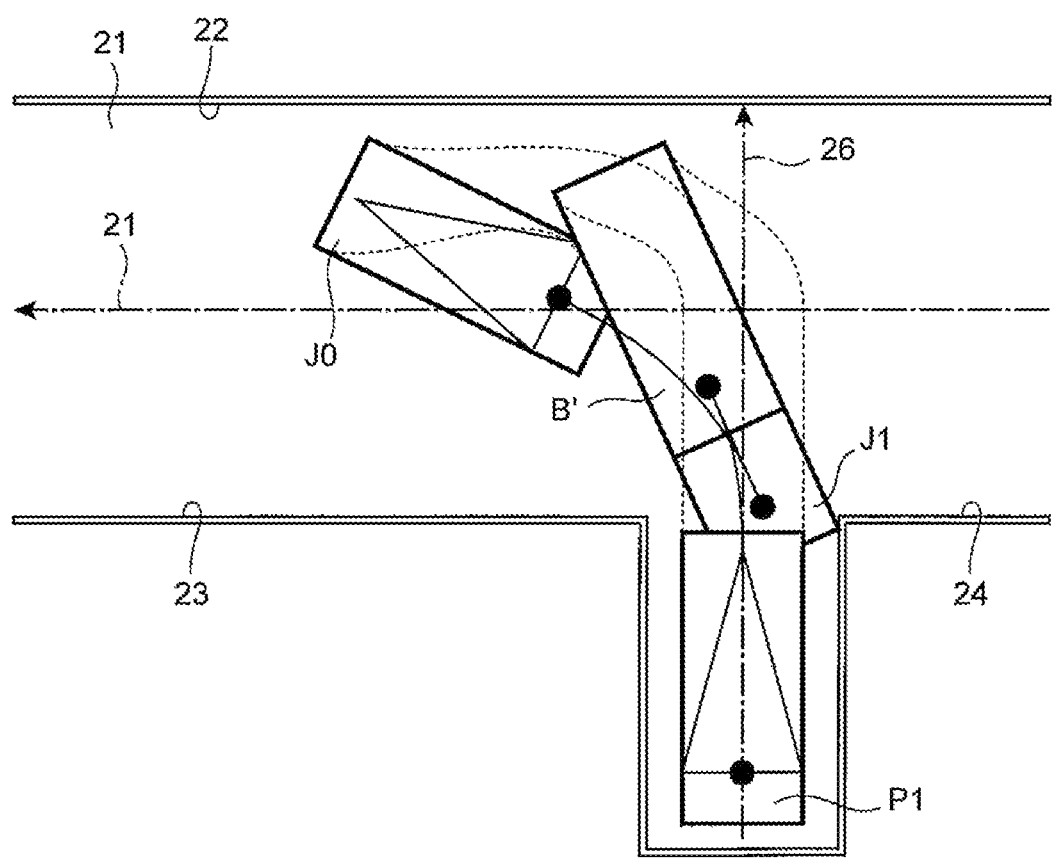
FIG. 19 illustrates a back-up position and a park-out position on the parking path illustrated in FIG. 18.

FIG. 18 illustrate an example of the parking path for starting backing up the vehicle V while turning it to the left, and FIG. 19 schematically illustrates the parking path illustrated in FIG. 18.

The parking path for starting movement of the vehicle V while turning it to the left includes a path for starting backing up the vehicle V from the stop position J0 while turning it to the left (FIG. 18(1)), backing up the vehicle V to the back-up position J1 (FIG. 18(2)), moving the vehicle V forward from the back-up position J1 to the park-out position B' (FIG. 18(3)), and backing up the vehicle V from the park-out position B' to the target parking position P1 (FIG. 18(4)).

In the example illustrated in FIGS. 18 and 19, a position at which the virtual frame of the vehicle V contacts the obstacle 24 behind as a result of the vehicle V having been backed up from the stop position J0 while being turned to the left is set as the separated position J1. Then, a candidate connection position that can be reached from the back-up position J1 through a single-side steering maneuver or an S-turn steering maneuver is selected as the park-out position B' from among the plurality of reset candidate connection positions. Therefore, a connection path is computed that allows the vehicle V to start backing up from the stop position J0 while being turned to the left so as to move to the separated position J1, and then reach the park-out position B' from the separated position J1. In addition, a pull-out path of from the target parking position P1 to the park-out position B' is used. Therefore, once the connection path and the pull-out path are connected at the park-out position B', a parking path of from the stop position J0 of the vehicle to the target parking position P1 in the parking space 20 can be computed.

Figure 20:
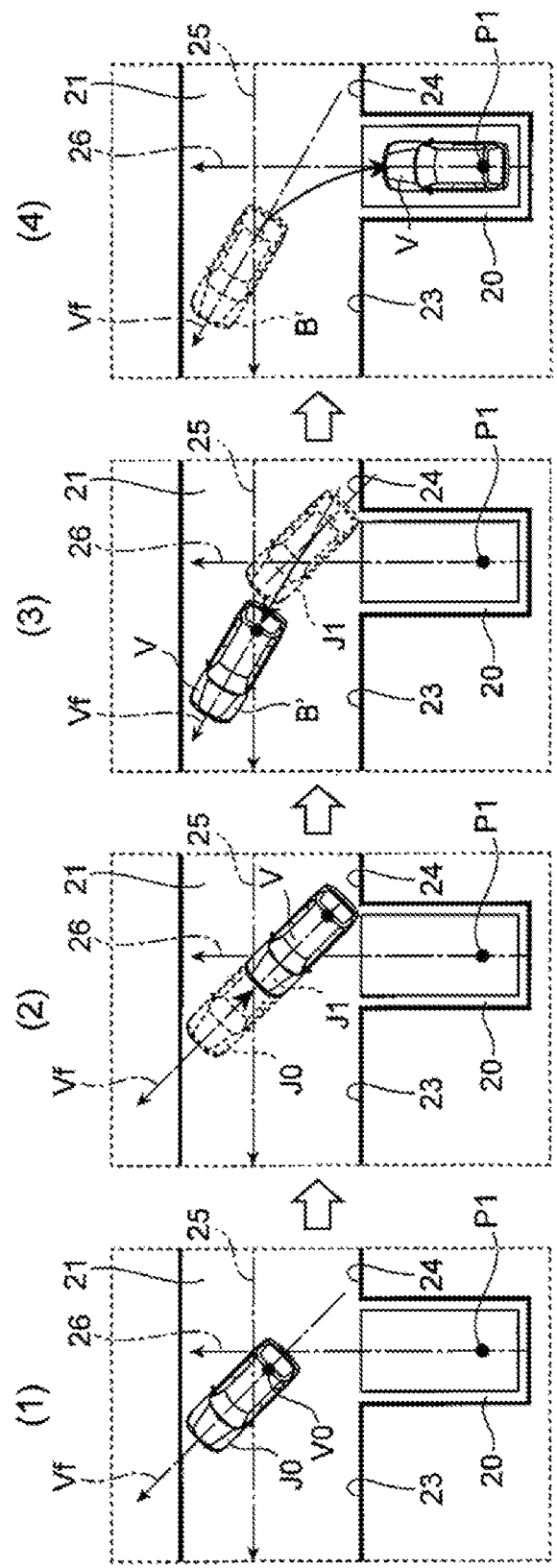
FIG. 20 illustrate a parking path that uses a connection path for backing up the vehicle straight.
Figure 21:
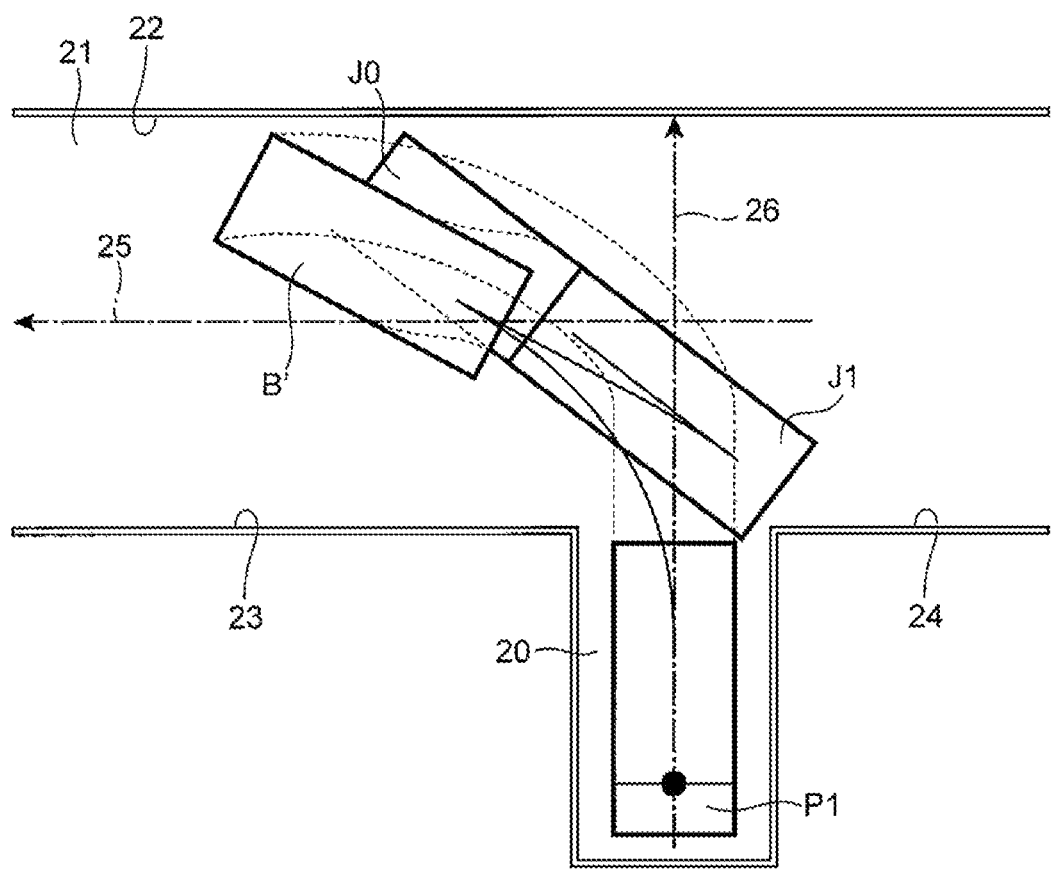
FIG. 21 illustrates a back-up position and a park-out position on the path illustrated in FIG. 20.

FIG. 20 illustrate a parking path that uses the connection path for backing up the vehicle straight. FIG. 21 illustrates a back-up position and a park-out position on the path illustrated in FIG. 20.

The parking path for starting movement of the vehicle V straight along the vehicle orientation Vf includes a path for starting backing up the vehicle V straight from the stop position J0 along the vehicle orientation Vf (FIG. 20 (1)), backing up the vehicle V to the back-up position J1 (FIG. 20(2)), moving the vehicle V forward from the back-up position J1 to the park-out position B' (FIG. 20(3)), and backing up the vehicle from the park-out position B' to the target parking position P1 (FIG. 20(4)).

In the example illustrated in FIGS. 20 and 21, a position at which the virtual frame of the vehicle V contacts the obstacle 24 behind as a result of the vehicle V having been backed up straight from the stop position J0 is set as the separated position J1. Then, a candidate connection position that can be reached from the back-up position J1 through a single-side steering maneuver or an S-turn steering maneuver is selected as the park-out position B' from among the plurality of reset candidate connection positions. Therefore, a connection path that allows the vehicle V to start backing up straight from the stop position J0 so as to move to the separated position J1, and then reach the park-out position B' from the separated position J1 is computed. In addition, a pull-out path of from the target parking position P1 to the park-out position B' is used. Therefore, once the connection path and the pull-out path are connected at the park-out position B', a parking path of from the stop position J0 of the vehicle to the target parking position P1 in the parking space 20 can be computed.

Figure 22:
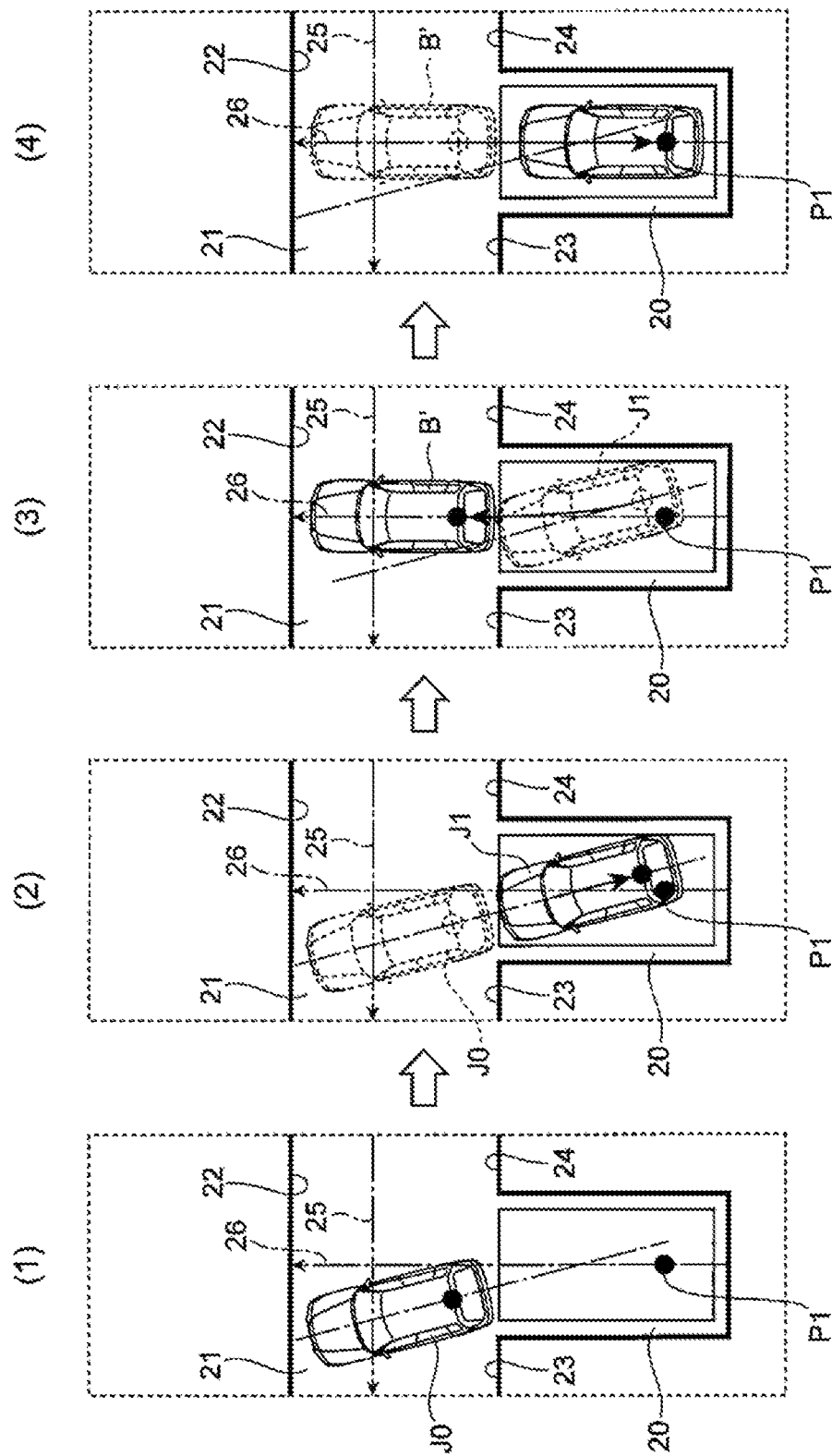
FIG. 22 illustrate a parking path that uses a connection path for backing up the vehicle straight.
Figure 23:
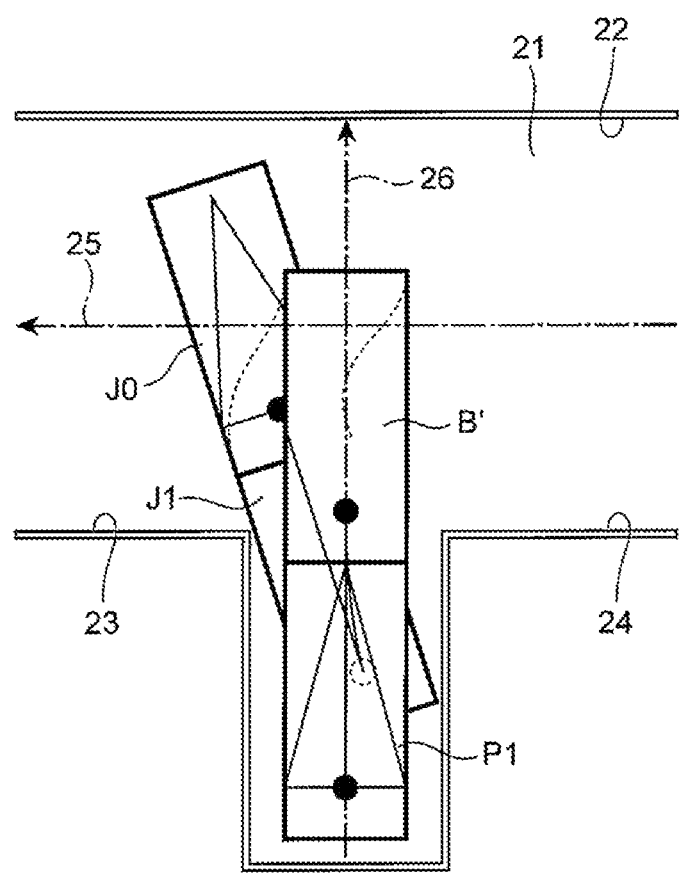
FIG. 23 illustrates a back-up position and a park-out position on the parking path illustrated in FIG. 22.

FIG. 22 illustrate a parking path that uses the connection path for backing up the vehicle straight. FIG. 23 illustrates a back-up position and a park-out position on the parking path illustrated in FIG. 22. In the present embodiment, a plurality of candidate connection positions is set on the pull-out path for pulling the vehicle V straight out of the parking space along the parking orientation 26, and one of them is used as the park-out position B'. The candidate connection position setting unit 12 sets a plurality of candidate connection positions at predetermined intervals along the parking orientation 26.

The parking path for starting movement of the vehicle V straight along the vehicle orientation Vf includes a path for starting backing up the vehicle V straight from the stop position J0 along the vehicle orientation Vf (FIG. 22(1)), backing up the vehicle V to the back-up position J1 (FIG. 22(2)), moving the vehicle V forward from the back-up position J1 to the park-out position B' (FIG. 22(3)), and backing up the vehicle V from the park-out position B' to the target parking position P1 (FIG. 22(4)).

In the example illustrated in FIGS. 22 and 23, a position at which the virtual frame of the vehicle V contacts an obstacle behind as a result of the vehicle V having been backed up straight from the stop position J0 is set as the separated position J1.

Then, a candidate connection position that can be reached from the back-up position J1 through a single-side steering maneuver or an S-turn steering maneuver is selected as the park-out position B' from among the plurality of candidate connection positions reset on the pull-out path for pulling the vehicle straight out of the parking space along the parking orientation 26.

Therefore, a connection path is computed that allows the vehicle V to start backing up straight from the stop position J0 so as to move to the separated position J1, and then reach the park-out position B' from the separated position J1. In addition, a pull-out path of from the target parking position P1 to the park-out position B' is used. Therefore, once the connection path and the pull-out path are connected at the park-out position B', a parking path of from the stop position J0 of the vehicle to the target parking position P1 in the parking space 20 can be computed.

It should be noted that if there is a plurality of candidate connection positions that can be reached in the embodiments illustrated in FIGS. 16 to 23, an optimal candidate connection position is selected as the park-out position B' on the basis of conditions such as a movement time and the number of steering maneuvers needed to move the vehicle V from the separated position J1 to the candidate connection position.

The aforementioned parking assistance device 1 computes, if there is an obstacle on the parking path, a parking path of from the stop position J0 of the vehicle V to the target parking position P1 and sets the computed parking path as a new parking path. Therefore, moving the vehicle V along the reset parking path can park the vehicle V in the parking space 20.

Although the embodiments of the present invention have been described in detail above, the present invention is not limited thereto, and various design changes can be made without departing from the spirit or scope of the present invention recited in the claims. For example, although the aforementioned embodiments have been described in detail to clearly illustrate the present invention, the present invention need not include all of the configurations described in the embodiments. It is possible to replace a part of a configuration of an embodiment with a configuration of another embodiment. In addition, it is also possible to add, to a configuration of an embodiment, a configuration of another embodiment. Further, it is also possible to, for a part of a configuration of each embodiment, add, remove, or substitute a configuration of another embodiment.

REFERENCE SIGNS LIST

1 Parking assistance device
11 Pull-out path computing unit
12 Candidate connection position setting unit
13 Reachable path computing unit
14 Parking path setting unit
15 Path resetting unit
16 Display unit
20 Parking space
21 Road
22, 23, 24 Obstacle
25 Road orientation
26 Parking orientation
V Vehicle
Vo Reference point (position of vehicle)
P0 Initial position
P1 Target parking position
B, B' Park-out position
C Reachable limit position
D Candidate connection position

The invention claimed is:

1. A parking assistance device for assisting in parking a vehicle in a parking space that is provided on one side of a road, comprising:
- a pull-out path computing unit configured to compute a pull-out path for pulling the vehicle out of the parking space on the basis of information on the parking space and constraint conditions regarding vehicle behavior;
- a candidate connection position setting unit configured to set a plurality of candidate connection positions on the pull-out path computed by the pull-out path computing unit;
- a reachable path computing unit configured to compute a reachable path that allows the vehicle to reach at least one of the plurality of candidate connection positions from an initial position of the vehicle;
- a parking path setting unit configured to set a parking path of from the initial position of the vehicle to the parking space by connecting the pull-out path and the reachable path; and
- a path resetting unit configured to, when there is an obstacle on the parking path, compute a parking path of from a stop position of the vehicle to the parking space, and set the computed parking path as a new parking path.

2. The parking assistance device according to claim 1, wherein:
the pull-out path computing unit is configured to recompute a pull-out path for pulling the vehicle out of the parking space on the basis of information on the parking space and constraint conditions regarding vehicle behavior when the vehicle stopped moving,
the candidate connection position setting unit is configured to reset a plurality of candidate connection positions on the pull-out path recomputed by the pull-out path computing unit, and
the path resetting unit is configured to compute a connection path for moving the vehicle from the stop position to a separated position that is away from the stop position by switching a gearshift of the vehicle from forward drive to reverse drive or from reverse drive to forward drive at the stop position, and then allowing the vehicle to reach one of the plurality of candidate connection positions reset by the candidate connection position setting unit from the separated position, and reset the parking path by connecting the connection path and the pull-out path recomputed by the pull-out path computing unit.

3. The parking assistance device according to claim 2, wherein the separated position is a position at which, when the vehicle is moved by being turned so that a vehicle orientation of the vehicle becomes parallel with and in the same orientation as a parking orientation of the parking space, the vehicle is located opposite an obstacle at a movement destination of the vehicle with a predetermined gap secured between the vehicle and the obstacle within a range of the parking orientation as a limit.

4. The parking assistance device according to claim 2, wherein the separated position is a position at which, when the vehicle is moved by being turned so that a vehicle orientation of the vehicle becomes parallel with and in the same orientation as a road orientation of the road, the vehicle is located opposite an obstacle at a movement destination of the vehicle with a predetermined gap secured between the vehicle and the obstacle within a range of the road orientation as a limit.

5. The parking assistance device according to claim 2, wherein the separated position is a position at which, when the vehicle is moved straight along a vehicle orientation of the vehicle, the vehicle is located opposite an obstacle at a movement destination of the vehicle with a predetermined gap secured between the vehicle and the obstacle.

6. The parking assistance device according to claim 2, wherein the path resetting unit is configured to compute a plurality of parking paths, select one of the plurality of parking paths on the basis of a predetermined evaluation function, and set the selected parking path as a new parking path.

7. The parking assistance device according to claim 6, wherein the evaluation function is set using at least one of a movement time, a movement distance, an amount of turn, the presence or absence of another vehicle behind the vehicle, a parking environment, energy needed for parking, or a user's need regarding the reset parking path.

8. The parking assistance device according to claim 1, further comprising an informing unit configured to convey information that the parking path is being reset by the path resetting unit.

* * * * *